US011057290B2

(12) United States Patent
Rathi et al.

(10) Patent No.: US 11,057,290 B2
(45) Date of Patent: Jul. 6, 2021

(54) PING/TRACEROUTE FOR STATIC LABEL SWITCHED PATHS (LSPS) AND STATIC SEGMENT ROUTING TRAFFIC ENGINEERING (SRTE) TUNNELS

(71) Applicant: Juniper Networks, Inc., Sunnyvale, CA (US)

(72) Inventors: Deepti Nirmalkumarji Rathi, Bangalore (IN); Arunkumar P, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 82 days.

(21) Appl. No.: 16/578,261

(22) Filed: Sep. 20, 2019

(65) Prior Publication Data
US 2021/0092037 A1 Mar. 25, 2021

(51) Int. Cl.
*H04L 12/803* (2013.01)
*H04L 12/26* (2006.01)

(52) U.S. Cl.
CPC .............. *H04L 43/10* (2013.01); *H04L 43/50* (2013.01)

(58) Field of Classification Search
CPC ..... H04L 47/125; H04L 45/507; H04L 45/24; H04L 45/50; H04L 47/122; H04L 47/12; H04L 45/48; H04L 49/555; H04L 47/10; H04L 43/10; H04L 45/28; H04L 43/0811; H04L 45/00
See application file for complete search history.

(56) References Cited

U.S. PATENT DOCUMENTS

| | | | | |
|---|---|---|---|---|
| 7,940,695 B1* | 5/2011 | Bahadur | ............... | H04L 49/555 370/254 |
| 2015/0109907 A1* | 4/2015 | Akiya | ................... | H04L 45/507 370/229 |
| 2016/0057043 A1* | 2/2016 | Osborne | ................. | H04L 43/10 370/248 |

OTHER PUBLICATIONS

Gray et al, "MPLS On-Demand Connectivity Verification and Route Tracing," draft-ietf-mpls-tp-on-demand-cv-07 from http://datatracker.ietf.org/drafts/current/, pp. 1-22 (Internet Engineering Task Force, Sep. 27, 2011).

(Continued)

*Primary Examiner* — Jung Liu
(74) *Attorney, Agent, or Firm* — John C. Pokotylo; Pokotylo Patent Services

(57) ABSTRACT

A static label-switched path (LSP) over which packets belonging to a forwarding equivalency class (FEC) are forwarded may be tested by (a) generating a multi-protocol label switching (MPLS) echo request message including a target FEC stack type-length-value (TLV), the target FEC stack TLV having a Nil FEC sub-TLV; and (b) sending the MPLS echo request message with a label stack corresponding to the FEC for forwarding over the static LSP. A static segment routed traffic engineered (SRTE) path, including at least two segments, over which packets belonging to a forwarding equivalency class (FEC) are forwarded, may be tested by (a) generating a multi-protocol label switching (MPLS) echo request message including, for each of the at least two segments, a target FEC stack type-length-value (TLV), each target FEC stack TLV having a Nil FEC sub-TLV; and (b) sending the MPLS echo request message with a label stack corresponding to the FEC for forwarding over the static SRTE path.

14 Claims, 20 Drawing Sheets

(56) References Cited

OTHER PUBLICATIONS

Kompella et al, "Detecting Multi-Protocol Label Switched (Mpls) Data Plane Failures," *Request for Comments 4379* (Internet Engineering Task Force, Feb. 2006).

Extended European Search Report to corresponding European Patent Application No. 19215576.0-1215, dated May 18, 2020 (11 pgs.).

Kompella et al, "Detecting Multiprotocol Label Switched (MPLS) Data-Plane Failures," *Request for Comments 8029* (Internet Engineering Task Force, Mar. 2017).

Kumar et al, "Label Switched Path (LSP) Ping/Traceroute for Segment Routing (SR) IGP-Prefix and IGP-Adjacency Segment Identifiers (SIDs) with MPLS Data Planes," *Request for Comments 8287* (Internet Engineering Task Force, Dec. 2017).

\* cited by examiner

PING/TRACEROUTE FOR STATIC LABEL SWITCHED PATHS (LSPS) AND STATIC SEGMENT ROUTING TRAFFIC ENGINEERING (SRTE) TUNNELS

§ 1. BACKGROUND OF THE INVENTION

§ 1.1 Field of the Invention

The present description concerns communications networks. More specifically, the present description concerns ping and/or traceroute operations for a communications network segment employing static multi-protocol label switching (MPLS) LSPs or segment routing (SR) tunnels.

§ 1.2 Background Information

§ 1.2.1 Multi-Protocol Label Switching (MPLS)

Although multiprotocol label switching (MPLS) is well understood by those of ordinary skill in the art, it is introduced here for the reader's convenience. MPLS is a method for engineering traffic patterns by assigning short labels to network packets that describe how to forward them through the network. MPLS is independent of routing tables or any routing protocol and can be used for unicast packets. More specifically, in a traditional Internet protocol (IP) network, packets are transmitted with an IP header that includes a source and destination address. When a router receives such a packet, it examines its forwarding tables for the next-hop address associated with the packet's destination address and forwards the packet to the next-hop location. On the other hand, in an MPLS network, each packet is encapsulated with an MPLS header. When a router receives the packet, it copies the header as an index into a separate MPLS forwarding table. Each entry in the MPLS forwarding table includes forwarding information that the router uses to forward the traffic and modify, when necessary, the MPLS header. Since the MPLS forwarding table has far fewer entries than the more general forwarding table, the lookup consumes less processing time and processing power. The resultant savings in time and processing are a significant benefit for traffic that uses the network to transit between outside destinations only.

Label-switched paths (LSPs) are unidirectional routes through a network or autonomous system (AS). In normal IP routing, the packet has no predetermined path. Instead, each router forwards a packet to the next-hop address stored in its forwarding table, based only on the packet's destination address. Each subsequent router then forwards the packet using its own forwarding table. In contrast, MPLS routers (within an AS) determine paths through a network through the exchange of MPLS traffic engineering information. Using these paths, the routers direct traffic through the network along an established route. Rather than selecting the next hop along the path as in IP routing, each router is responsible for forwarding the packet to a predetermined next-hop address.

Routers that are part of the LSP are referred to label-switching routers (LSRs). Each LSR must be configured with MPLS so that it can interpret MPLS headers and perform the MPLS operations required to pass traffic through the network. An LSP can include four types of LSRs. First, an ingress or inbound LSR provides the entry point for traffic into MPLS. Native IPv4 packets are encapsulated into the MPLS protocol by the ingress router. Each LSP can have only one ingress router. Second, a transit LSR is any router in the middle of an LSP. Transit LSRs forward MPLS traffic along the LSP, using only the MPLS header to determine how the packet is routed. Third, the penultimate LSR is the second-to-last router in the LSP. If penultimate hop popping (PHP) is employed, the penultimate LSR is responsible for stripping the MPLS header from the packet before forwarding it to the outbound router. Fourth, the egress or outbound LSR is the endpoint for the LSP. The egress router receives MPLS packets from the penultimate LSR and performs an IP route lookup. The egress router then forwards the packet to the next hop of the route. Each LSP can have only one outbound router.

To forward traffic through an MPLS network, MPLS routers encapsulate packets and assign and manage headers known as labels. A label is a 20-bit unsigned integer in the range 0 through 1,048,575. The routers use the labels to index the MPLS forwarding tables that determine how packets are routed through the network. When a network's inbound router receives traffic, it inserts an MPLS label between the IP packet and the appropriate Layer 2 header for the physical link. The label contains an index value that identifies a next-hop address for the particular LSP. When the next-hop transit router receives the packet, it uses the index in the MPLS label to determine the next-hop address for the packet and forwards the packet to the next router in the LSP. As each packet travels through the transit network, every router along the way performs a lookup on the MPLS label and forwards the packet accordingly. When the egress router receives a packet, it examines the header to determine that it is the final router in the LSP. The egress router then removes the MPLS header, performs a regular IP route lookup, and forwards the packet with its IP header to the next-hop address.

LSRs can perform five label operations, First, a "push" operation adds a new label to the top of the packet. For IPv4 packets arriving at the inbound router, the new label is the first label in the label stack. For MPLS packets with an existing label, this operation adds a label to the stack and sets the stacking bit to 0, indicating that more MPLS labels follow the first. When the ingress router receives the packet, it performs an IP route lookup on the packet. Because the route lookup yields an LSP next hop, the ingress router performs a label push on the packet, and then forwards the packet to the LSP next hop. Second, a "swap" (or switch) operation replaces the label at the top of the label stack with a new label. When a transit router receives the packet, it performs an MPLS forwarding table lookup. The lookup yields the LSP next hop and the path index of the link between the transit router and the next router in the LSP. Third, a "pop" operation removes the label from the top of the label stack. For IPv4 packets arriving at the penultimate router, the entire MPLS label is removed from the label stack. For MPLS packets with an existing label, this operation removes the top label from the label stack and modifies the stacking bit as necessary (e.g., sets it to 1 if only a single label remains in the stack). If multiple LSPs terminate at the same outbound router, the router performs MPLS label operations for all outbound traffic on the LSPs. To share the operations among multiple routers, most LSPs use penultimate hop popping (PHP). Fourth, a "multiple push" operation adds multiple labels to the top of the label stack. This action is equivalent to performing multiple push operations. Finally, a "swap and push" operation replaces the top label with a new label and then pushes a new label to the top of the stack.

An MPLS LSP may be established either (A) statically (e.g., via manual configuration), or (B) dynamically (e.g., using a protocol such as the label distribution protocol (LDP) or the resource reservation protocol (RSVP)). Like a static route, a static LSP requires each router along the path to be configured explicitly. A network administrator must manually configure the path and its associated label values. Static LSPs require less processing by the LSRs because no signaling protocol is used. However, because paths are statically configured, they cannot adapt to network conditions. Dynamic LSPs use signaling protocols to establish themselves and propagate LSP information to other LSRs in the network. A network administrator configures the inbound router with LSP information that is transmitted throughout the network when they enable the signaling protocols across the LSRs. Because the LSRs must exchange and process signaling packets and instructions, dynamic LSPs consume more resources than static LSPs. However, dynamic LSPs can avoid the network problems by detecting topology changes and outages and propagating them throughout the network.

FIG. 1 illustrates an example of an LSP between ingress router R1 (PE1) and egress router R5 (PE2). Typically, when MPLS is deployed, penultimate hop popping ("PHP") is used instead of ultimate hop popping ("UHP"). Router CE1 forwards an Internet Protocol (IP) packet to its next hop (R1), which is also the LSP ingress (or headend). R1 checks prefix 5.5.5.5 (destination loopback) against the following information stored in its forwarding table:

```
enugadi@Enugadi# run show route 5.5.5.5
inet.0: 16 destinations, 17 routes (15 active, 0 holddown, 1 hidden)
+ = Active Route, - = Last Active, * = Both
5.5.5.5/32         *[Static/5] 01:33:28
                    > to 10.0.0.2 via ge-0/0/0.10, Push 1000002
                   [OSPF/10] 01:01:42, metric 5
                    > to 10.0.0.2 via ge-0/0/0.10
```

R1 pushes label L1 (L1-1000002) on the packet and forwards the labeled packet (L1+IP) to router R2. R2 checks input label 1000002 against the following information stored in its MPLS forwarding table:

```
enugadi@Enugadi# run show route table mpls.0 label 1000002
logical-router r2
mpls.0: 6 destinations, 6 routes (6 active, 0 holddown, 0 hidden)
+ = Active Route, - = Last Active, * = Both
1000002         *[Static/5] 00:45:22
                 > to 10.0.0.6 via ge-0/1/0.10, Swap 1000003
```

As a result, R2 completes the standard MPLS label swapping operation, swapping label L1 for label L2 (L2-10000003), and forwards the labeled packet (L2+IP) to router R3. R3 checks the input label 10000003 against the following information stored in its MPLS forwarding table:

```
enugadi@Enugadi# run show route table mpls.0 label 1000003
logical-router r3
mpls.0: 5 destinations, 5 routes (5 active, 0 holddown, 0 hidden)
+ = Active Route, - = Last Active, * = Both
1000003         *[Static/5] 00:50:03
                 > to 10.0.0.10 via ge-0/0/0.11, Swap 1000004
```

As a result, R3 completes the standard MPLS label swapping operation, swapping label L2 for label L3 (L3-10000004), and forwards the labeled packet (L3+IP) to router R4. R4 checks the input label 10000004 against the following information stored in its MPLS forwarding table:

```
enugadi@Enugadi# run show route table mpls.0 label 1000004
logical-router r4
mpls.0: 6 destinations, 6 routes (6 active, 0 holddown, 0 hidden)
+ = Active Route, - = Last Active, * = Both
1000004         *[Static/5] 01:24:54
                 > to 10.0.0.14 via ge-0/0/0.11, Swap 0
1000004(S=0)    *[Static/5] 01:24:54
                 > to 10.0.0.14 via ge-0/0/0.11, Pop
```

Since R4 is the penultimate-hop router for the LSP to router R5 (PE2), it first pops the label L3 and then forwards the packet (e.g., with label 0, not shown) to router R5. When R5 receives the packet, it can have a service label, an explicit-null label, or just be a plain IP or VPLS packet. R5 then forwards the unlabeled packet to router CE2.

In summary, with the static LSP, R1 reaches R5 through MPLS labeling which is indicated by traceroute result below:

```
enugadi@Enugadi# run traceroute 5.5.5.5
traceroute to 5.5.5.5 (5.5.5.5), 30 hops max, 40 byte packets
 1  10.0.0.2 (10.0.0.2)  0.172 ms  0.118 ms  0.109 ms
     MPLS Label=1000002 CoS=0 TTL=1 S=1
 2  10.0.0.6 (10.0.0.6)  0.204 ms  0.194 ms  0.192 ms
     MPLS Label=1000003 CoS=0 TTL=1 S=1
 3  10.0.0.10 (10.0.0.10)  0.288 ms  0.283 ms  0.280 ms
     MPLS Label=1000004 CoS=0 TTL=1 S=1
 4  5.5.5.5 (5.5.5.5)  0.336 ms  0.332 ms  0.336 ms
```

§ 1.2.2 Segment Routing (SR)

Segment routing (also referred to as Source Packet Routing in Networking ("SPRING")) is a control-plane architecture that enables an ingress router to steer a packet through a specific set of nodes and links in the network without relying on the intermediate nodes in the network to determine the actual path it should take. In this context, the term "source" means the point at which the explicit route is imposed. Segment routing is defined in "Segment Routing Architecture," *Request for Comments* 8402 (July 2018, the Internet Engineering Task Force) (referred to as "RFC 8402" and incorporated herein by reference). SPRING enables automation of a network by using a software-defined network ("SDN") controller for traffic steering and traffic engineering in a wide area network ("WAN") packet network.

Segment routing leverages the source routing paradigm. A node steers a packet through an ordered list of instructions, called "segments." For example, an ingress router (also referred to as "a headend router") can steer a packet through a desired set of nodes and links by prepending the packet with segments that contain an appropriate combination of tunnels.

§ 1.2.2.1 SR Domain

An SR domain is a collection of nodes that participate in SR protocols. Within an SR domain, a node can execute ingress, transit, or egress procedures. FIG. 2 depicts a network in which a source node sends a packet to a destination node. The source and destination nodes reside outside of the SR domain, but the path between them traverses the SR domain. More specifically, when the packet arrives at the SR ingress node (R1), the ingress node subjects the packet to policy. Policy can associate a packet with an SR path. Policy includes match conditions and actions. If the packet satisfies match conditions, the SR ingress node (R1) can encapsulate the packet in an SR tunnel. The SR tunnel traverses an SR path to the egress node (R6).

The SR path can be engineered to satisfy any number of constraints (e.g., minimum link bandwidth, maximum path latency). While an SR path can follow the least cost path to the egress node, constraints can cause it to follow another path.

The source node and the SR ingress node may reside on independent hardware platforms (e.g., on a laptop and a router, respectively), or the source node and SR ingress node can reside on the same hardware (e.g., on a virtual machine and a hypervisor, respectively). Similarly, the SR egress node and the destination node can reside on independent hardware platforms, or on a single platform. In a less typical configuration, the source node resides within the SR domain. In this case, the source node is also the SR ingress node, because it executes SR ingress procedures Similarly, the destination node can reside within the SR domain, in which case, the destination node is also the SR egress node, because it executes SR egress procedures.

§ 1.2.1.2 SR Path

An SR path is an ordered list of segments that connects an SR ingress node to an SR egress node. Although an SR path can follow the least cost path from ingress to egress, it can also follow another path.

Different SR paths can share the same segment. For example, referring to FIG. 3, Path A connects ingress node A to egress node Z, while Path B connects ingress node B to the same egress node Z. Both paths A and B traverse Segment 3.

When an SR ingress node encapsulates a packet in an SR tunnel, it encodes the associated segment list in the tunnel header. It then forwards the packet downstream. Transit nodes process the tunnel header, forwarding the packet from the current segment to the next segment. Since the SR ingress node encodes path information in the tunnel header, transit nodes do not need to maintain information regarding each path that they support. Rather, the transit nodes are only required to process the tunnel header, forwarding the packet from the current segment to the next segment. This is a major benefit of SR. More specifically, since transit nodes are not required to maintain path information, overhead associated with maintaining that information is eliminated, routing protocols are simplified, scaling characteristics are improved, and network operations become less problematic.

§ 1.2.2.3 SR Segments and Segment Types

An SR segment is an instruction that causes a packet to traverse a section of the network topology. While a segment (i.e., an instruction) causes a packet to traverse a section of the network topology, it is distinct from that section of the network topology. SR defines many different SR segment types. Among these are the "adjacency segments" and "prefix segments." Each of these types of segments is described below.

An adjacency segment is an instruction that causes a packet to traverse a specified link (i.e., a link that is associated with an IGP adjacency). FIG. 4 depicts an SR path that connects ingress node R1 to egress node R6. The path contains the following adjacency segments: (1) segment 1, instantiated on R1, causes packets to traverse link R1→R2; (2) segment 2, instantiated on R2, causes packets to traverse link R2→R3; and segment 3, instantiated on R3, causes packets to traverse link R3→R6. If any of the above-mentioned links becomes unavailable, so does the associated adjacency segment. Consequently, if any of the above-mentioned adjacency segments becomes unavailable, so does the entire path.

Thus, an adjacency segment is a strict forwarded single-hop tunnel that carries packets over a specific link between two nodes, irrespective of the link cost.

A prefix segment is an instruction that causes a packet to traverse the least cost path (or a path determined using an identified algorithm) to a node or prefix. Referring to FIG. 5A, assume that all links are configured with the same interior gateway protocol (IGP) metric and that the SR path is to be a least cost (and therefore) shortest path. An SR path connects ingress node R1 to egress node R6 and contains the following prefix segments: (1) segment 1, instantiated on R1, causes packets to traverse the least cost path from R1 to R2; (2) segment 2, instantiated on R2 and R3, causes packets to traverse the least cost path from the instantiating node to R6. Consequently, when the links are all available, the SR path guides packets through the above-mentioned links and segments.

Referring to FIG. 5B, assume that the link R1→R2 becomes unavailable. When this occurs, the network establishes a new least cost path between R1 and R2. This new least cost path includes Links R1→R4, and R4→R2. Since the network has established a new least cost path between R1 and R2, segment 1 remains available and causes packets to traverse the new least cost path. The behavior of segment 2 is unchanged. Therefore, the path now traverses Links R1→R4, R4→R2, R2→R3 and R3→R6.

Thus, a prefix segment is a multihop tunnel that uses equal cost multi-hop aware shortest path links to reach a prefix. A prefix segment identifier (SID) supports both IPv4 and IPv6 prefixes. A node segment is a special case of prefix segment that uses shortest path links between two specific nodes.

§ 1.2.2.4 SR Multi-Protocol Label Switching (MPLS)

In SR-MPLS, SR paths are encoded as MPLS label stacks, with each label stack entry representing a segment in the SR path. The following describes how MPLS labels are used to encode adjacency and prefix segments.

Referring to FIG. 6, an SR path connects R1 to R4. The SR path contains three adjacency segments. Segment 1 causes packets to traverse link R1→R2, segment 2 causes packets to traverse link R2→R3, and segment 3 causes packets to traverse link R3→R4. When R1 receives a packet from outside of the SR domain, it subjects the packet to policy. Policy may cause R1 to forward the packet through the SR path shown in FIG. 6. When this occurs, R1 imposes an MPLS label stack containing two entries. The entry at the top of the stack represents segment 2 and carries MPLS label 1002. The entry at the bottom of the stack represents segment 3 and carries MPLS label 1003.

Having imposed an MPLS label stack, R1 forwards the encapsulated packet through segment 1 (i.e., Link R1→R2). When the packet arrives at R2, R2 extracts the top label (i.e., 1002) from the label stack and searches for a corresponding entry in its Forwarding Information Base ("FIB"). The corresponding FIB entry includes an instruction (i.e., POP) and a next-hop (i.e., R3). Therefore, R2 pops the topmost label from the label stack and forwards the packet through segment 2 (i.e., Link R2→R3).

When the packet arrives at R3, R3 extracts the label (i.e., 1003) from the remaining label stack and searches for a corresponding entry in its FIB. The corresponding FIB entry includes an instruction (i.e., POP) and a next-hop (i.e., R4). Therefore, R3 pops the remaining entry from the label stack and forwards the packet through segment 3 (i.e., Link R3→R4). As shown in FIG. 6, after traversing the SR path, the packet arrives at R4 without MPLS encapsulation.

In FIG. 7, an SR path connects R1 to R7 via R4. The SR path contains two prefix segments. Segment 1 is a prefix segment that causes packets to traverse the (e.g., least cost) path from R1 to R4. Segment 2 is a prefix segment that causes packets to traverse the (e.g., least cost) path from R4 to R7. In this network, assume that all links are configured with the same IGP metric (e.g., 10). Therefore, the least cost path for the first segment from R1 to R4 traverses links R1→R2, R2→R3 and R3→R4, while the least cost path for the second segment from R4 to R7 traverses links R4→R8 and R8→R7.

When R1 receives a packet from outside of the SR domain, it subjects the packet to policy. Policy may cause R1 to forward the packet through the SR path shown in FIG. 7. When this occurs, R1 imposes an MPLS label stack containing two entries. The top entry of the label stack represents segment 1 and carries the label 2001. The bottom entry of the label stack represents segment 2 and carries the label 2002. Having imposed an MPLS label stack, R1 forwards the encapsulated packet into segment 1 via link R1→R2.

When the packet arrives at R2, R2 extracts the top label (i.e., 2001) from the label stack and searches for a corresponding entry in its FIB. The corresponding FIB entry includes an instruction (i.e., SWAP—3001) and a next-hop (i.e., R3). Therefore, R2 overwrites the topmost label with a new value (i.e., 3001) and forwards the packet to R3.

When the packet arrives at R3, R3 extracts the top label (i.e., 3001) from the label stack and searches for a corresponding entry in its FIB. The corresponding FIB entry includes an instruction (i.e., POP) and a next-hop (i.e., R4). Therefore, R3 pops the topmost entry from the label stack and forwards the packet into segment 2 via link R3→R4.

When the packet arrives at R4, R4 extracts the remaining label (i.e., 2002) from the label stack and searches for a corresponding entry in its FIB. The corresponding FIB entry includes an instruction (i.e., SWAP—3002) and a next-hop (i.e., R8). Therefore, R4 overwrites the remaining label with a new value (i.e., 3002) and forwards the packet to R8.

When the packet arrives at R8, R8 extracts the remaining label (i.e., 3002) from the label stack and searches for a corresponding entry in its FIB. The corresponding FIB entry includes an instruction (i.e., POP) and a next-hop (i.e., R7). Therefore, R8 pops the remaining entry from the label stack and forwards the packet to R7 without MPLS encapsulation.

§ 1.2.2.4.1 Penultimate Hop Popping (PHP) and the Explicit Null Label

In the examples above, each segment executes PHP procedures. That is, when a packet traverses a segment, the segment's penultimate node pops the label associated with the segment. If the SR path contains another segment, yet to be traversed, the current segment's egress node is also the ingress node of the next segment. In this case, the packet arrives at that node with the next segment's label exposed on the top of the stack. If the SR path does not contain another segment, yet to be traversed, the segment egress node is also the path egress node. In that case, the packet arrives at the path egress node without MPLS encapsulation.

In some cases, the final link in the SR path may not be able to carry the packet without MPLS encapsulation. For example, the packet may be IPv6, while the link supports IPv4 only. In order to prevent this problem, the SR ingress node can add an MPLS Explicit Null label to the top of the MPLS label stack.

When the penultimate node in the final segment pops the label associated with the final segment, it exposes the Explicit Null label. It then forwards the packet to the path egress node. The path egress node pops the Explicit Null label and continues to process the packet.

§ 1.2.2.5 Configuration and Distribution of Segment Identifiers (SIDs)

The foregoing examples described with respect to FIGS. 6 and 7 assumed that MPLS labels were distributed and each node's FIB was populated. Essentially segment routing engages interior gateway protocols ("IGPs") like Intermediate-System Intermediate-System ("IS-IS") and open shortest path first ("OSPF") for advertising two types of network segments or tunnels—(1) a strict forwarded single-hop tunnel that carries packets over a specific link between two nodes, irrespective of the link cost (referred to as "adjacency segments," which were described in § 1.2.2.3 above), and (2) a multihop tunnel using shortest path links between two specific nodes (referred to as "node segments," which were described in § 1.2.2.3 above).

Each segment is associated with an identifier, which is referred to as the segment identifier ("SID"). As already noted above, an ordered list of segments is encoded as a stack of labels. A segment can represent any instruction, topological or service-based. A segment can have a local semantic to a segment routing node or to a global node within a segment routing domain. Segment routing enforces a flow through any topological path and service chain while maintaining per-flow state only at the ingress node to the segment routing domain. Segment routing can be directly applied to the MPLS architecture with no change on the forwarding plane. A segment is encoded as an MPLS label. An ordered list of segments is encoded as a "stack" of labels or "label stack." The segment to be processed is on the top of the stack (i.e., the outermost label of the label stack). Upon completion of a segment, the related label is "popped" (i.e., removed) from the stack.

§ 1.2.3 Existing Ping and Traceroute Procedures (RFCs 8029 and 8287)

When an LSP fails to deliver user traffic, the failure cannot always be detected by the MPLS control plane. There is a need to provide a tool that would enable users to detect such traffic "black holes" or misrouting within a reasonable period of time and a mechanism to isolate faults. The document, "Detecting Multiprotocol Label Switched (MPLS) Data-Plane Failures," *Request for Comments* 8029 (March 2017, the Internet Engineering Task Force)(referred to as "RFC 8029" and incorporated herein by reference) describes the use of Echo and Traceroute requests and replies to test MPLS data plane failures. RFC 8029 describes a simple and efficient mechanism to detect data-plane failures in MPLS Label Switched Paths (LSPs). It defines a probe message called an "MPLS echo request" and a response message called an "MPLS echo reply" for returning the result of the probe. The MPLS echo request is intended to contain sufficient information to check correct operation of the data plane and to verify the data plane against the control plane, thereby localizing faults. MPLS ping is used for connectivity checks, and MPLS traceroute is used for hop-by-hop fault localization as well as path tracing.

The basic idea behind RFC 8029 is to verify that packets that belong to a particular forwarding equivalency class (FEC) actually end their MPLS path on an LSR that is an egress for that FEC. RFC 8029 carries out this test by sending a packet (called an "MPLS echo request") along the same data path as other packets belonging to this FEC. An MPLS echo request also carries information about the FEC whose MPLS path is being verified. This echo request is forwarded just like any other packet belonging to that FEC.

In "ping" mode (basic connectivity check), the packet should reach the end of the path, at which point it is sent to the control plane of the egress LSR, which then verifies whether it is indeed an egress for the FEC. In "traceroute" mode (fault isolation), the packet is sent to the control plane of each transit LSR, which performs various checks to confirm that it is indeed a transit LSR for this path; this LSR also returns further information that helps check the control plane against the data plane, i.e., that forwarding matches what the routing protocols determined as the path.

FIG. 8 illustrates a UDP datagram carrying an MPLS echo request or reply 890. The UDP datagram may be labeled. The UDP datagram header 850 may include a 16-bit source port field 852, a 16-bit destination port field 854 (e.g., set to 3503 to indicate the UDP packet is an MPLS Echo), a 16-bit length field 858 and a 16-bit checksum field 858.

Still referring to FIG. 8, the UPD datagram may be provided in an Internet protocol (IP) datagram. The IP datagram header 810 may include a 4-bit version field 812, a 4-bit Internet header length (IHL) field 814, an 8-bit type of service field 816, a 16-bit total length field 818, a 16-bit identification field 820, a 3-bit flags field 822, a 13-bit fragment offset field 824, an 8-bit time to live (TTL) filed 826, an 8-bit protocol field 828, a 16-bit header checksum field 830, a 32-bit source IP address field 832, a 32-bit destination IP address field 834, a 24-bit options field (e.g., setting a router alert), and padding 838.

The value in the TTL field 826 may be manipulated to have the MPLS Echo Request progress down the LSP or SRTE path being tested in a traceroute operation. Alternatively, the value in the TTL field 826 may be set to a sufficiently high value (e.g., 255) in a to reach the end of the LSP or SRTE path being tested in a ping operation.

FIG. 9 illustrates details of the MPLS echo request or reply 850' per RFC 8029. As shown, the MPLS echo request or reply 850' includes a 16-bit version number field 902, a 16-bit global flags field 904, an 8-bit message type field 912, an 8-bit reply mode field 914, an 8-bit return code field 916, an 8-bit return subcode field 918, a 32-bit sender's handle field 920, a 32-bit sequence number field 930, a 32-bit time stamp sent (seconds) field 940, a 32-bit time stamp sent (seconds fraction) field 950, a 32-bit time stamp received (seconds) field 960, a 32-bit time stamp received (seconds fraction) field 970, and one or more type-length-value tuples (TLVs) or sub-TLVs.

The version number field 902 is to be incremented whenever a change is made that affects the ability of an implementation to correctly parse or process an MPLS echo request/reply.

The global flags field 904 is a bit vector which currently includes zeros and three flags; a Validate FEC Stage (V) flag, a Respond Only if Time To Live (TTL) Expired (T) flag and a Validate Reverse Path (R) flag. The V flag is set to 1 if the sender wants the receiver to perform FEC Stack validation; if V is 0, the choice is left to the receiver. The T flag is set only in the echo request packet by the sender. If the T flag is set to 1 in an incoming echo request, and the TTL of the incoming MPLS label is more than 1, then the receiving node drops the incoming echo request and does not send any echo reply to the sender. The T flag is not set in the echo reply packet. When the R flag is set in the echo request, the responder should return reverse-path FEC information.

The Message Type field 912 is set to 1 for MPLS Echo Request, and is set to 2 for an MPLS Echo Reply.

The Reply Mode field 914 is set to 1 for Do not reply, is set to 2 for Reply via an IPv4/IPv6 UDP packet, is set to 3 for Reply via an IPv4/IPv6 UDP packet with Router Alert, and is set to 4 for Reply via application-level control channel. An MPLS echo request would normally have 2 (Reply via an IPv4/IPv6 UDP packet) in the Reply Mode field 914.

Return Code 916 and Subcode 918 fields are described in Section 3.1 of RFC 8029. The Return Code is set to zero by the sender of an echo request. The receiver of the echo request can set it to one of the values listed below in the corresponding echo reply that it generates. The notation <RSC> refers to the Return Subcode. This field is filled in with the stack-depth for those codes that specify that. For all other codes, the Return Subcode is set to zero.

| Value | Meaning |
| --- | --- |
| 0 | No Return Code |
| 1 | Malformed echo request received |
| 2 | One or more of the TLVs was not understood |
| 3 | Replying router is an egress for the FEC at stack-depth <RSC> |
| 4 | Replying router has no mapping for the FEC at stack-depth <RSC> |
| 5 | Downstream Mapping Mismatch |
| 6 | Upstream Interface Index Unknown |
| 7 | Reserved |
| 8 | Label switched at stack-depth <RSC> |
| 9 | Label switched but no MPLS forwarding at stack-depth <RSC> |
| 10 | Mapping for this FEC is not the given label at stack-depth <RSC> |
| 11 | No label entry at stack-depth <RSC> |
| 12 | Protocol not associated with interface at FEC stack-depth <RSC> |
| 13 | Premature termination of ping due to label stack shrinking to a single label |
| 14 | See DDMAP TLV for meaning of Return Code and Return Subcode |
| 15 | Label switched with FEC change |

The Return Subcode (<RSC>) contains the point in the label stack where processing was terminated. If the <RSC> is 0, no labels were processed. Otherwise, the packet was label switched at depth <RSC>. The Return Code is per "Downstream Detailed Mapping TLV" (See, e.g., section 3.4 of RFC 8029.) This Return Code is used only in the message header and is set only in the MPLS echo reply message. If the Return Code is set in the MPLS echo request message, then it is ignored. When this Return Code is set, each Downstream Detailed Mapping TLV will have an appropriate Return Code and Return Subcode. This Return Code is used when there are multiple downstreams for a given node (such as Point-to-Multipoint (P2MP) or ECMP), and the node needs to return a Return Code/Return Subcode for each downstream. This Return Code may be used even when there is only one downstream for a given node.

The Sender's Handle field 920 is filled in by the sender and returned unchanged by the receiver in the echo reply (if any).

The Sequence Number field 930 is assigned by the sender of the MPLS echo request and can be (for example) used to detect missed replies.

The Timestamp Sent fields 940 and 950 carry the time of day (according to the sender's clock) when the MPLS echo request is sent. The Timestamp Received fields 960 and 970 carry in an echo replay, the time of day (according to the receiver's clock) when the corresponding echo request was received.

TLVs include a defined type, a length of the value field in octets, and a value field (which depends on the Type and is zero padded to align to a 4-octet boundary). TLVs may be nested within other TLVs, in which case the nested TLVs are called sub-TLVs. Sub-TLVs have independent types. A description of the Types and Values of the top-level TLVs for LSP ping are given below:

| Type # | Value Field |
|---|---|
| 1 | Target FEC Stack |
| 2 | Downstream Mapping (Deprecated) |
| 3 | Pad |
| 4 | Unassigned |
| 5 | Vendor Enterprise Number |
| 6 | Unassigned |
| 7 | Interface and Label Stack |
| 8 | Unassigned |
| 9 | Errored TLVs |
| 10 | Reply TOS Byte |
| 20 | Downstream Detailed Mapping |

Section 3.2 of RFC 8029 defines sub-TLVs for the Target FEC Stack (type 1) TLV. More specifically, A Target FEC Stack is a list of sub-TLVs. The number of elements is determined by looking at the sub-TLV length fields.

| Sub-Type | Length | Value Field |
|---|---|---|
| 1 | 5 | LDP IPv4 prefix |
| 2 | 17 | LDP IPv6 prefix |
| 3 | 20 | RSVP IPv4 LSP |
| 4 | 56 | RSVP IPv6 LSP |
| 5 |  | Unassigned |
| 6 | 13 | VPN IPv4 prefix |
| 7 | 25 | VPN IPv6 prefix |
| 8 | 14 | L2 VPN endpoint |
| 9 | 10 | "FEC 128" Pseudowire-IPv4 (deprecated) |
| 10 | 14 | "FEC 128" Pseudowire-IPv4 |
| 11 | 16+ | "FEC 129" Pseudowire-IPv4 |
| 12 | 5 | BGP labeled IPv4 prefix |
| 13 | 17 | BGP labeled IPv6 prefix |
| 14 | 5 | Generic IPv4 prefix |
| 15 | 17 | Generic IPv6 prefix |
| 16 | 4 | Nil FEC |
| 24 | 38 | "FEC 128" Pseudowire-IPv6 |
| 25 | 40+ | "FEC 129" Pseudowire-IPv6 |

Other FEC types have been defined and will be defined as needed. Note that this TLV defines a stack of FECs, the first FEC element corresponding to the top of the label stack, etc.

Request for Comments 8287, "Label Switched Path (LSP) Ping/Traceroute for Segment Routing (SR) IGP-Prefix and IGP-Adjacency Segment Identifiers (SIDs) with MPLS Data Planes" (Internet Engineering Task Force, December 2017) (referred to as "RFC 8287" and incorporated herein by reference) defines MPLS OAM mechanisms for SR-TE paths that help with fault detection and isolation for an MPLS data-plane path. Section 5 of RFC 8287 defines the following three (3) new sub-TLVs for the Target FEC Stack TLV (type 1) and for the Reverse-Path Target FEC Stack TLV (type 16) as follows:

| Sub-Type | Sub-TLV Name |
|---|---|
| 34 | IPv4 IGP-Prefix Segment ID |
| 35 | IPv6 IGP-Prefix Segment ID |
| 36 | IGP-Adjacency Segment ID |

Since the Forwarding Equivalence Class (FEC) is used to uniquely identify a MPLS session on a Label Switching Router (LSR), per RFC 8029, an MPLS echo request must have a Target FEC Stack that describes the FEC Stack being tested. Unfortunately, however, there is no Target FEC stack defined for statically provisioned LSPs. That is, RFC 8029 defines MPLS operations, administration and management (OAM) mechanisms for MPLS Tunnels, and RFC 8287 defines MPLS OAM mechanisms for SR-TE paths that help with fault detection and isolation for an MPLS data-plane path. These RFCs define Target Forwarding Equivalence Class (FEC) Stack sub-TLVs for identifying the MPLS session uniquely on the LSRs. As described above, these FEC Stack sub-TLVs are carried in MPLS echo request packets and validated by receiver of MPLS echo request. Unfortunately, however, there is no FEC defined for Static LSPs or Static SIDs. Therefore, when static SIDs are used in SRTE paths, MPLS traceroute cannot be performed because there is no defined FEC for Static MPLS tunnels.

Thus, there is a need to be able to test (e.g., using ping and traceroute mechanisms) statically configured MPLS tunnels and SRTE paths.

§ 2. SUMMARY OF THE INVENTION

Example embodiments (e.g., methods, apparatus and systems) consistent with the present description provide improved ping and traceroute mechanisms for testing a static label-switched path (LSP) over which packets belonging to a forwarding equivalency class (FEC) are forwarded. This may be done by (a) generating a multi-protocol label switching (MPLS) echo request message including a target FEC stack type-length-value (TLV), the target FEC stack TLV having a Nil FEC sub-TLV; and (b) sending the MPLS echo request message with a label stack corresponding to the FEC for forwarding over the static LSP.

In at least some example embodiments, the MPLS echo request message further includes a downstream detailed mapping TLV (DDMT). The DDMT may include a label-stack sub-TLV.

A transit router of the LSP may then receive the MPLS echo request message. Responsive to receiving the MPLS echo request message, the transit router may then check label information in the DDMT for validity against information in a local routing table of the transit router. If the transit router determines that the label information in the DDMT checked against information in a local routing table of the transit router is invalid, it may then generate an MPLS echo reply message (1) addressed to a router of the LSP that generated the MPLS echo request message and (2) including information encoding that there is no label entry in its local routing table corresponding to the information in the DDMT. Otherwise, if the transit router determines that the label information in the DDMT checked against information the local router table of the transit router is valid, it may generate an MPLS echo reply message (1) addressed to a router of the LSP that generated the MPLS echo request message and (2) including information encoding that the label was switched.

The egress router may receive the MPLS echo request message. If so, it may generate an MPLS echo reply message (1) addressed to a router of the LSP that generated the MPLS echo request message and (2) including information encoding that replying router is an egress router for the FEC.

In at least some example embodiments, the MPLS echo request message generated has an MPLS header with a time to live (TTL) value (e.g., 255) sufficient to reach an egress router of the LSP.

Other example embodiments (e.g., methods, apparatus and systems) consistent with the present description provide improved ping and traceroute mechanisms for testing a static segment routed traffic engineered (SRTE) path, including at least two segments, over which packets belonging to a forwarding equivalency class (FEC) are forwarded. This may be done by (a) generating a multi-protocol label switching (MPLS) echo request message including, for each of the at least two segments, a target FEC stack type-length-value (TLV), each target FEC stack TLV having a Nil FEC sub-TLV; and (b) sending the MPLS echo request message with a label stack corresponding to the FEC for forwarding over the static SRTE path.

In at least some example embodiments, the MPLS echo request message further includes a downstream detailed mapping TLV (DDMT). For example, the DDMT may include a label-stack sub-TLV.

A transit router of the LSP may receive the MPLS echo request message. Responsive to receiving the MPLS echo request message, the transit router may check label information in the DDMT for validity against information in a local routing table of the transit router. Responsive to a determination, by the transit router, that the information in the DDMT checked against information in a local routing table of the transit router is invalid, it may generate an MPLS echo reply message (1) addressed to a router of the LSP that generated the MPLS echo request message and (2) including information encoding that there is no label entry in its local routing table corresponding to the information in the DDMT. Otherwise, responsive to a determination, by the transit router, that the label information in the DDMT checked against information the local router table of the transit router is valid, it may generate an MPLS echo reply message (1) addressed to a router of the LSP that generated the MPLS echo request message and (2) including information encoding that the label was switched at a label stack depth set in the received MPLS echo request message.

A router at the end of a current segment of the SRTE path may receive the MPLS echo request message. If so, it may generate an MPLS echo reply message (1) addressed to a router of the LSP that generated the MPLS echo request message and (2) including a FEC Stack change TLV with a post office protocol (POP) operation type.

The egress router of the SRTE path may receive the MPLS echo request message. If so, it may generate an MPLS echo reply message (1) addressed to a router of the LSP that generated the MPLS echo request message and (2) including a return code indicating replying router is the egress router for the FEC at the current stack depth.

§ 3. BRIEF DESCRIPTION OF THE DRAWINGS

§ 4. DETAILED DESCRIPTION

The present description may involve novel methods, apparatus, message formats, and/or data structures for performing ping and/or traceroute operations for static LSPs and/or static SR tunnels (also referred to as "SRTE paths," without loss of generality). The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 Example Methods

Figure 10:
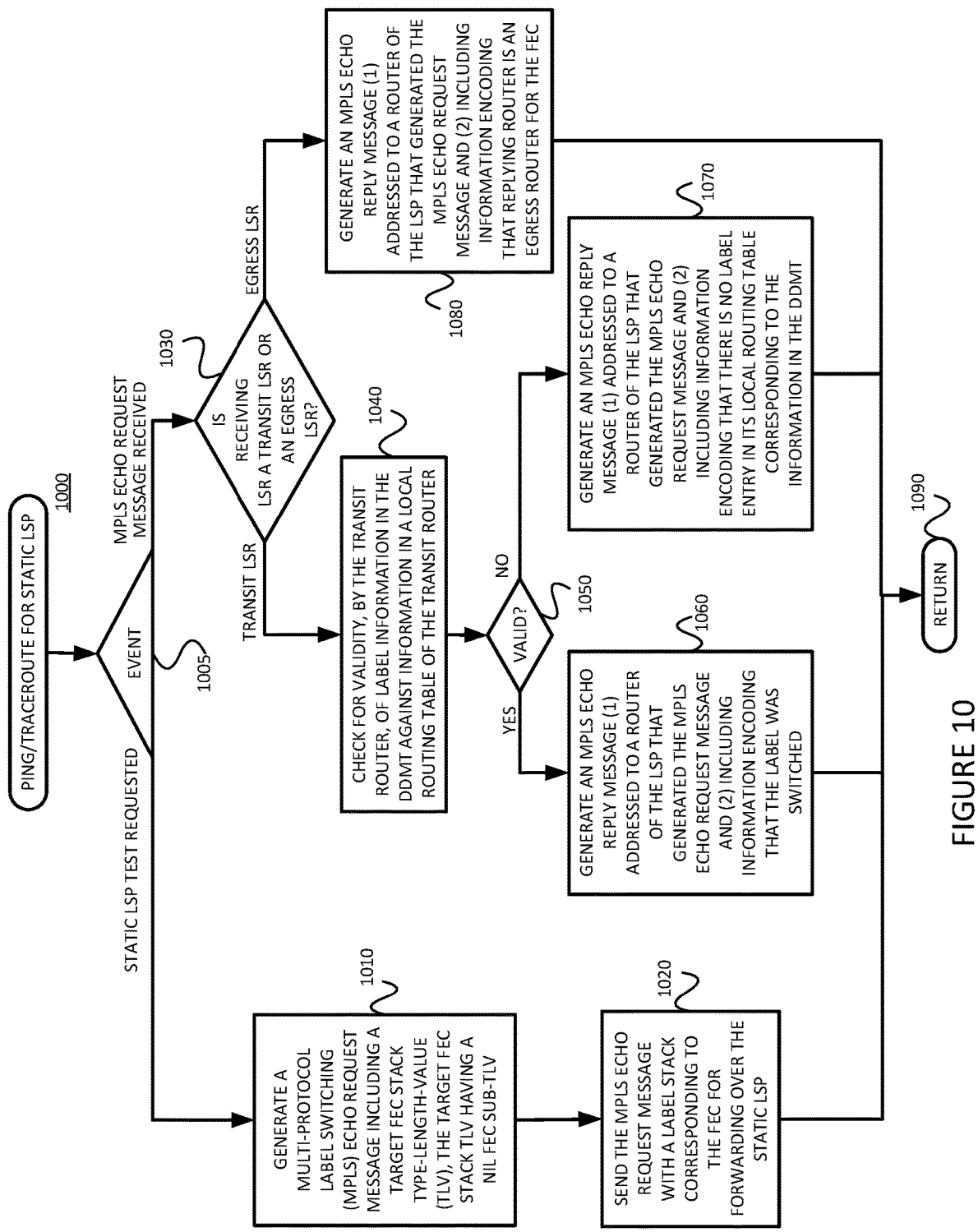
FIG. 10 is a flow diagram of an example method for performing a ping or traceroute operation in a statically configured LSP, in a manner consistent with the present description.

FIG. 10 is a flow diagram of an example method 1000 for performing an MPLS Ping or Traceroute operation on a static label-switched path (LSP) over which packets belonging to a forwarding equivalency class (FEC) are forwarded. Different branches of the method 1000 are performed in response to the occurrence of different events. (Event branch point 1005) Note that different parts of the example method 1000 may be performed, in a distributed manner, by a number of communications network devices such as, for example, an ingress router of an LSP being traced, a transit router of the LSP being traced and an egress router of the LSP being traced (all generally referred to as label-switching routers or LSRs).

Figure 1:
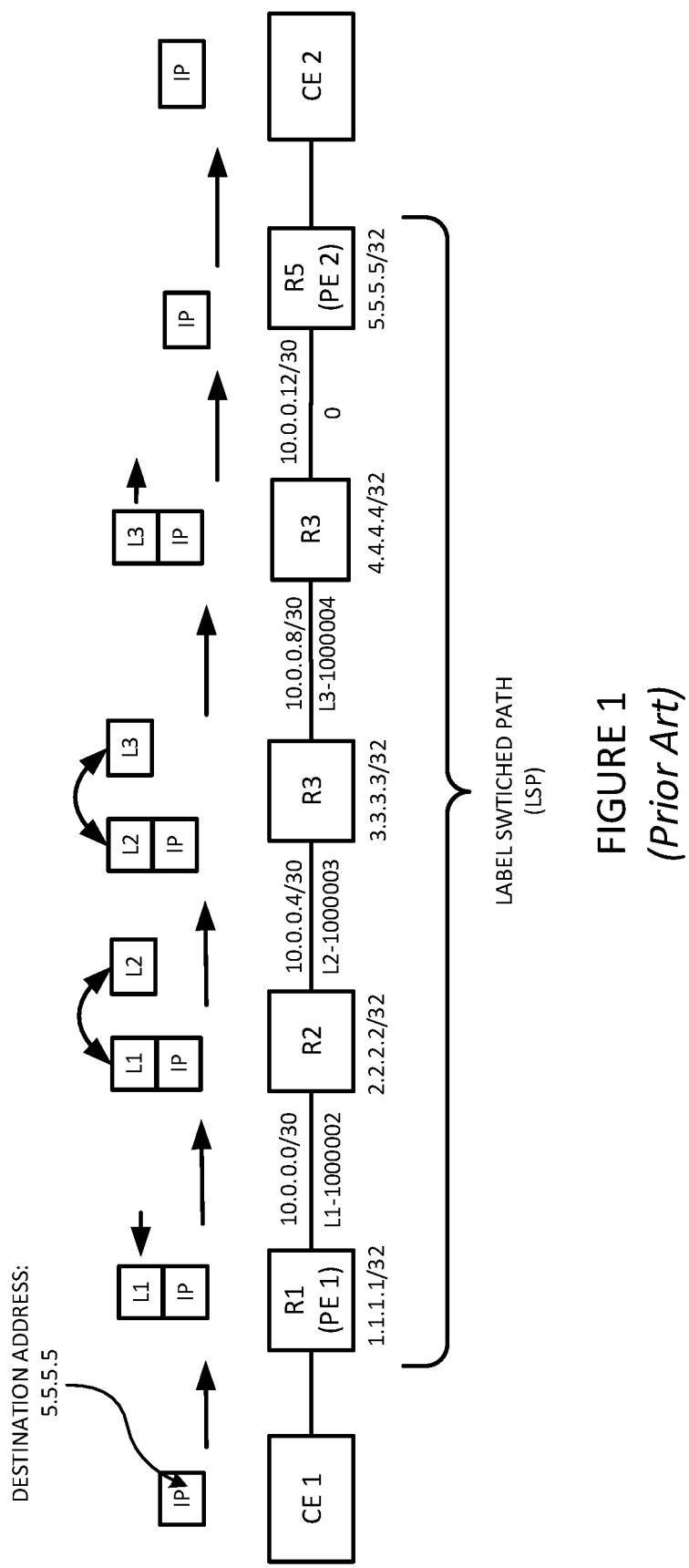
FIG. 1 illustrates a label switched path (LSP") between two routers.
Figure 2:
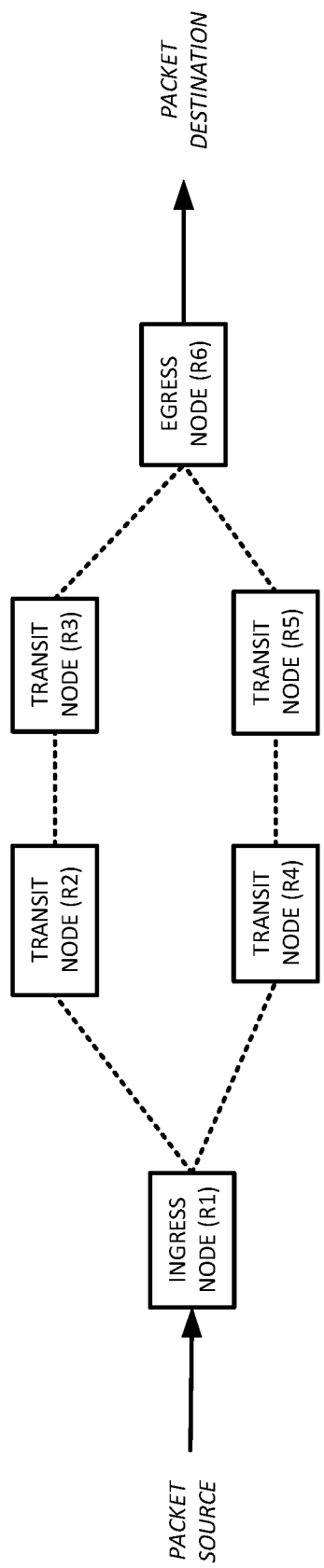
FIG. 2 is an example network used to illustrate an SR domain.
Figure 3:
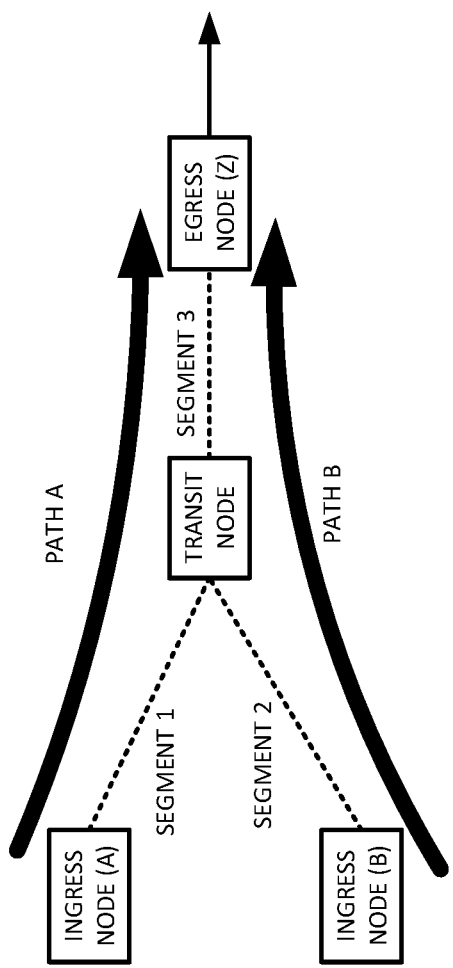
FIG. 3 is an example network used to illustrate SR paths through an SR domain.
Figure 4:
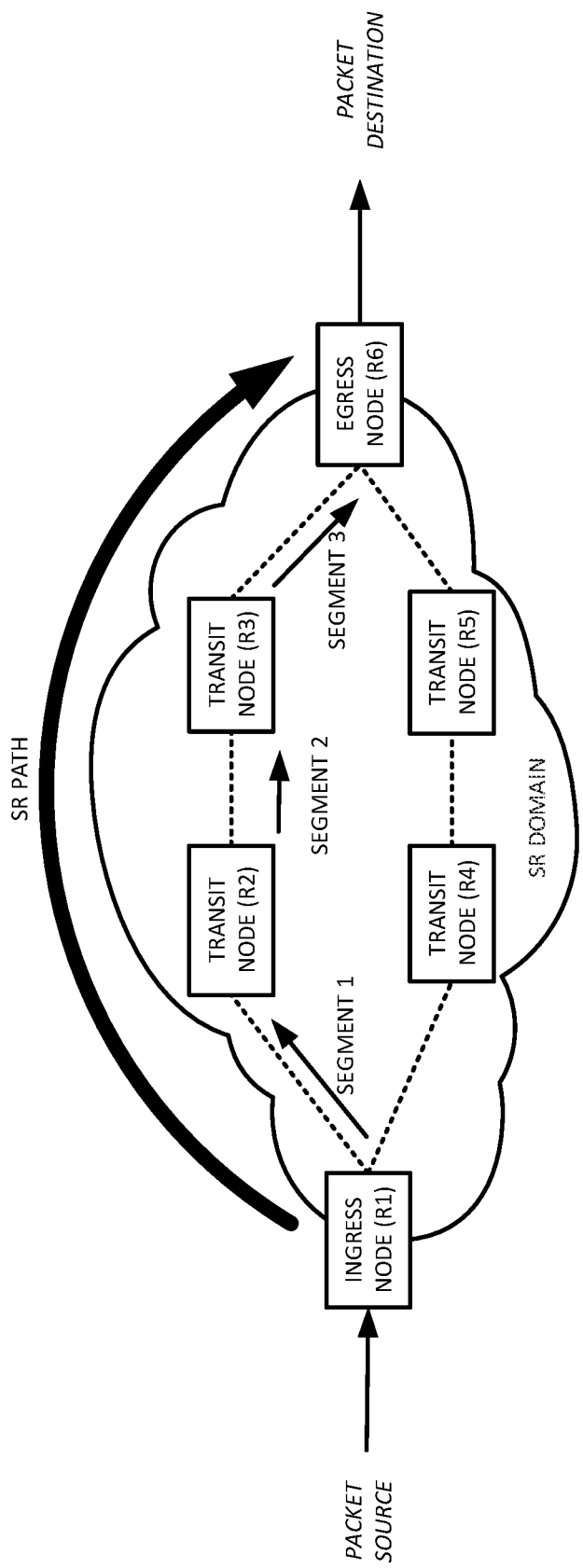
FIG. 4 is an example network used to illustrate adjacency segments in an SR domain.
Figure 5A:
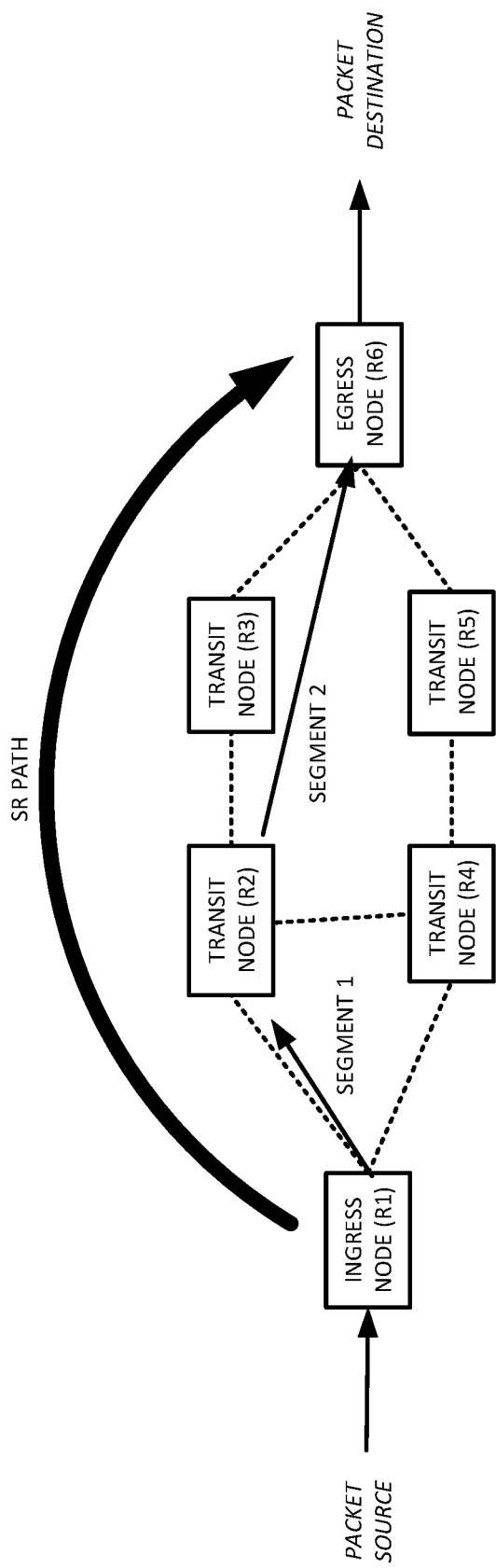
FIGS. 5A and 5B are an example network used to illustrate prefix segments in an SR domain.
Figure 5B:
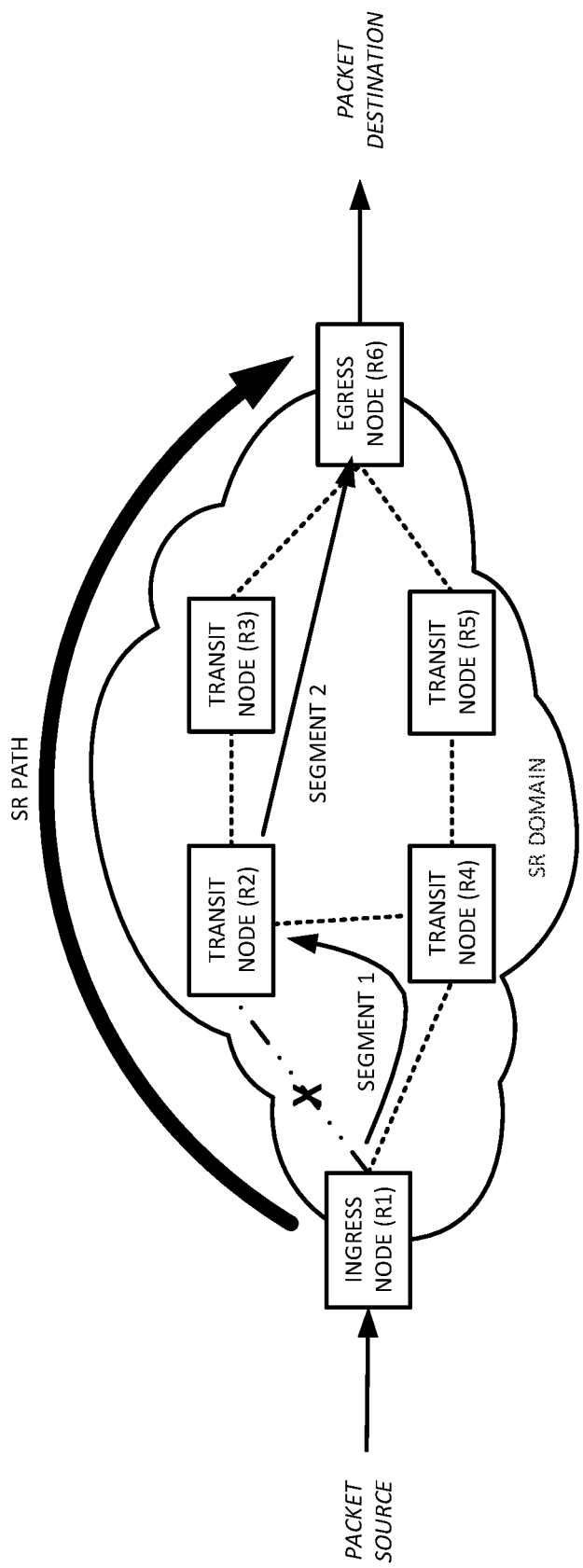
Figure 6:
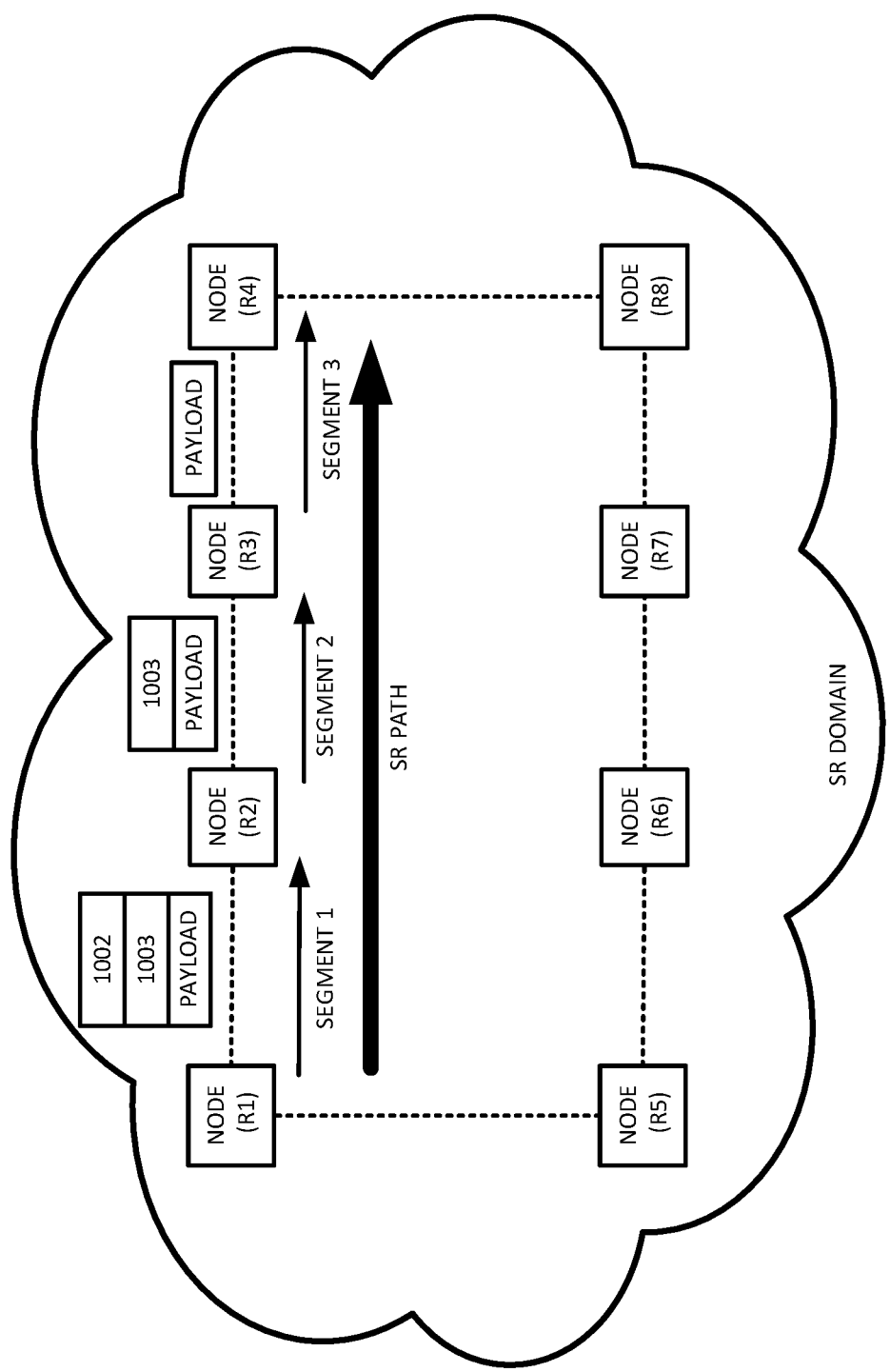
FIG. 6 is an example network used to illustrate the use of MPLS labels derived from adjacency segments.
Figure 7:
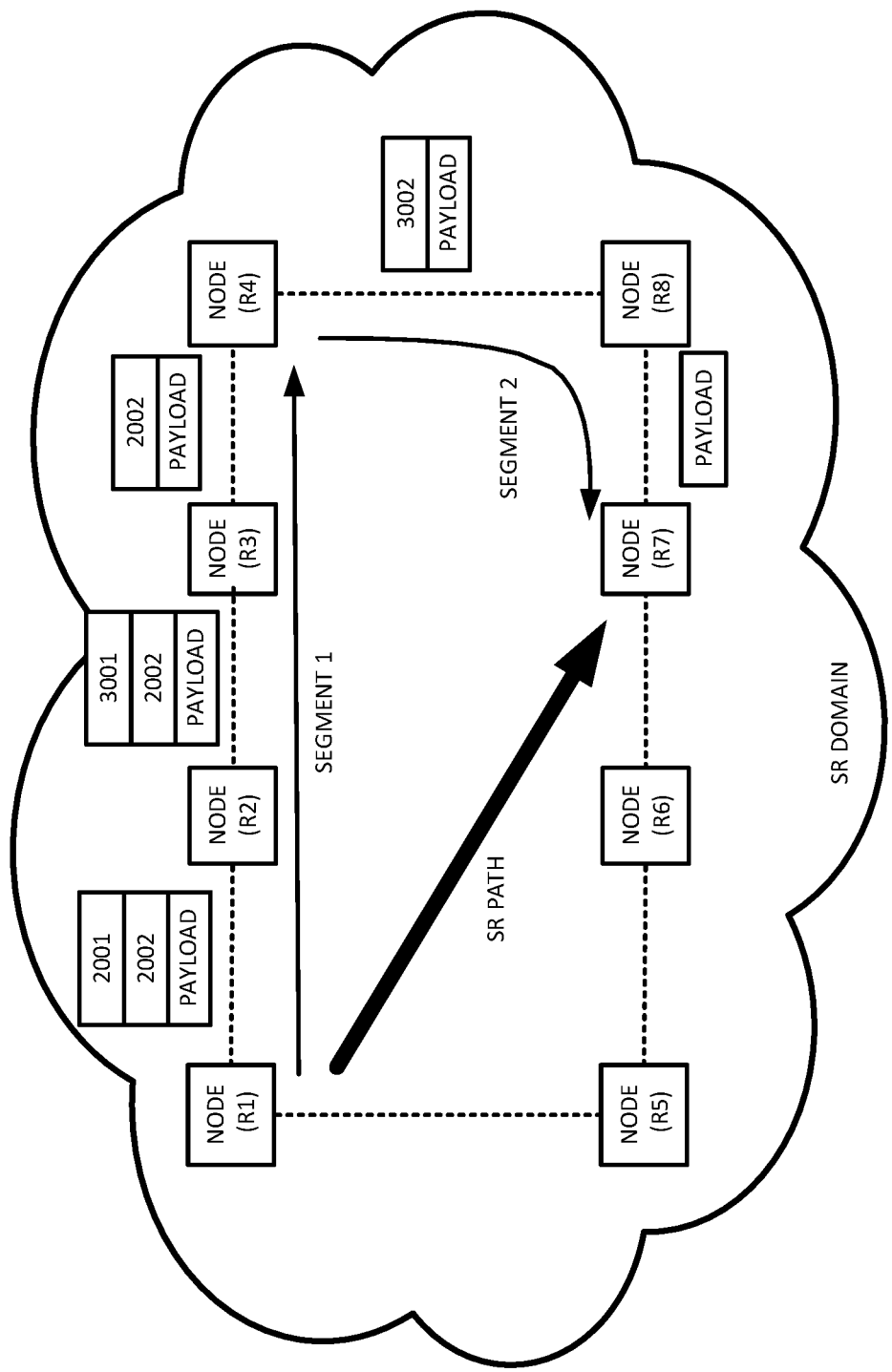
FIG. 7 is an example network used to illustrate the use of MPLS labels derived from prefix segments.
Figure 8:
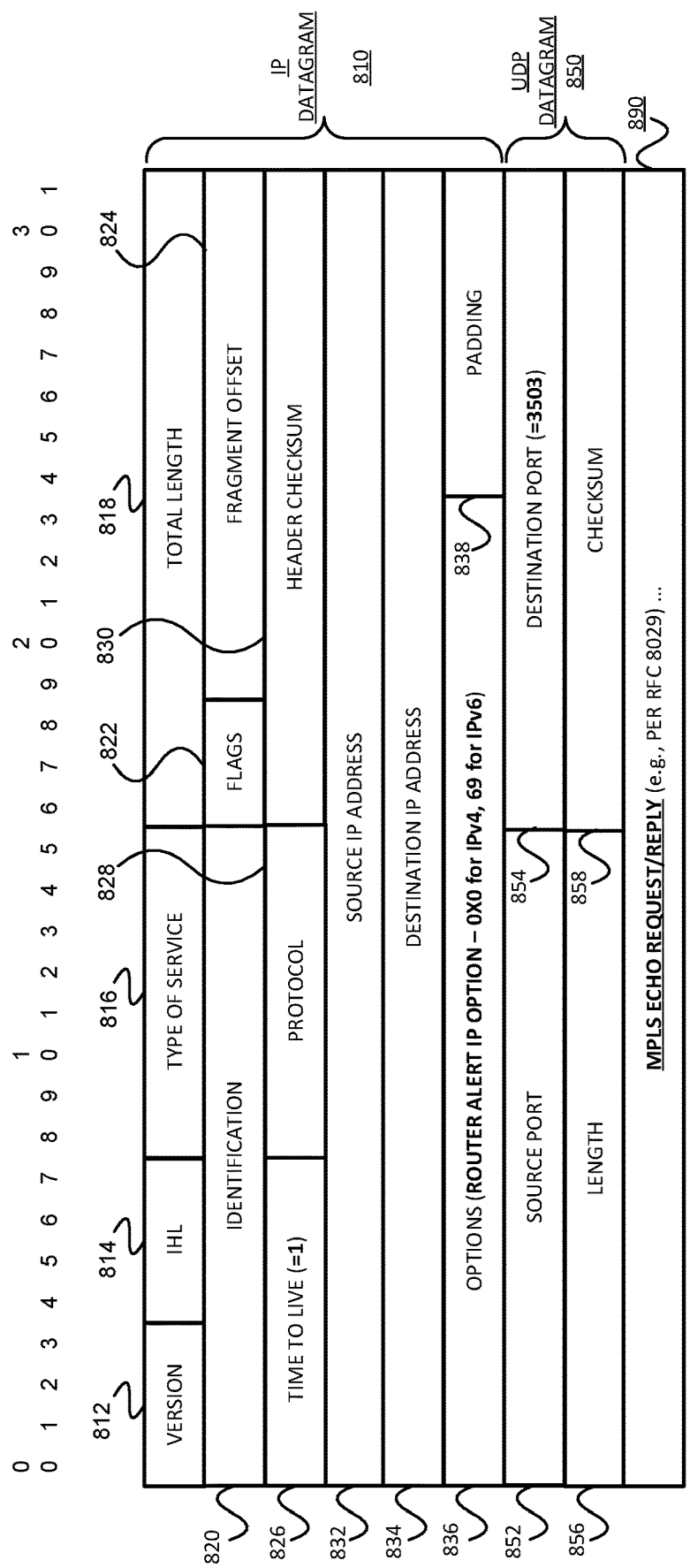
FIG. 8 illustrates an example data structure for carrying an MPLS Echo Request or Reply in a UDP datagram, which is carried in an IP datagram.

Referring to event branch point 1005, the left branch of the example method 1000 is performed (e.g., by the ingress router) in response to receiving a request for a static LSP test. As shown, the example method 1000 generates a multi-protocol label switching (MPLS) echo request message including a target FEC stack type-length-value (TLV), each of the target FEC stack TLV having a Nil FEC sub-TLV. (Block 1010) Note that for a ping test, the TTL value (Recall, e.g., field 826 of the IP datagram header 810 of FIG. 8) is set to 255 (or some value large enough to reach the end of the static LSP being tested). On the other hand, for a traceroute test, the TTL value is set to one (1) and is successively incremented as the test progresses down the static LSP being tested. Next, the example method 1000 sends the generated MPLS echo request, with a label stack corresponding to the FEC, for forwarding over the static LSP. (Block 1020) The example method 1000 is then left. (See Return Node 1090.)

Referring back to event branch point 1005, the center or right branch of the example method 1000 is performed in response to receipt of an MPLS echo request. The example method 1000 determines whether the receiving LSR is a transit LSR or an egress LSR of the LSP being tested. (For example, for protocols like the Resource Reservation Protocol (RSVP) and the Label Distribution Protocol (LDP), there is a FEC defined in RFC 8029. When ping or traceroute requests carry this FEC information to a transit node, the transit node can use so-called "control-plane verification" to verify whether it can understand the FEC or not.) If the receiving LSR is a transit LSR of the LSP being tested, the center branch of example method 1000 is performed. (Left branch of 1030) More specifically, the transit LSR checks for validity of label information in a downstream detailed mapping TLV (DDMT) against information (e.g., a label mapping entry) in its local routing table. (Block 1040) Responsive to a determination that the label information in the DDMT checked against information the local router table of the transit router is valid (Decision 1050, YES), the example method 1000 generates an MPLS echo reply message (1) addressed to a router of the LSP that generated the MPLS echo request message and (2) including information encoding that the label was switched. (Block 1060) The example method 1000 is then left. (Return node 1090) On the other hand, responsive to a determination that the label information in the DDMT checked against information in a local routing table of the transit router is invalid (Decision 1050, NO), the example method 1000 generates an MPLS echo reply message (1) addressed to a router of the LSP that generated the MPLS echo request message and (2) including information encoding that there is no label entry in its local routing table corresponding to the information in the DDMT. (Block 1070) The example method 1000 is then left. (Return Node 1090)

Referring back to decision 1030, if the receiving LSR is the egress LSR for the LSP being tested, the right branch of example method 1000 is performed. (Right branch of 1030) In this case, the example method 1000 generates an MPLS echo reply message (1) addressed to a router of the LSP that generated the MPLS echo request message and (2) including information encoding that replying router is an egress router for the FEC.

Figure 11:
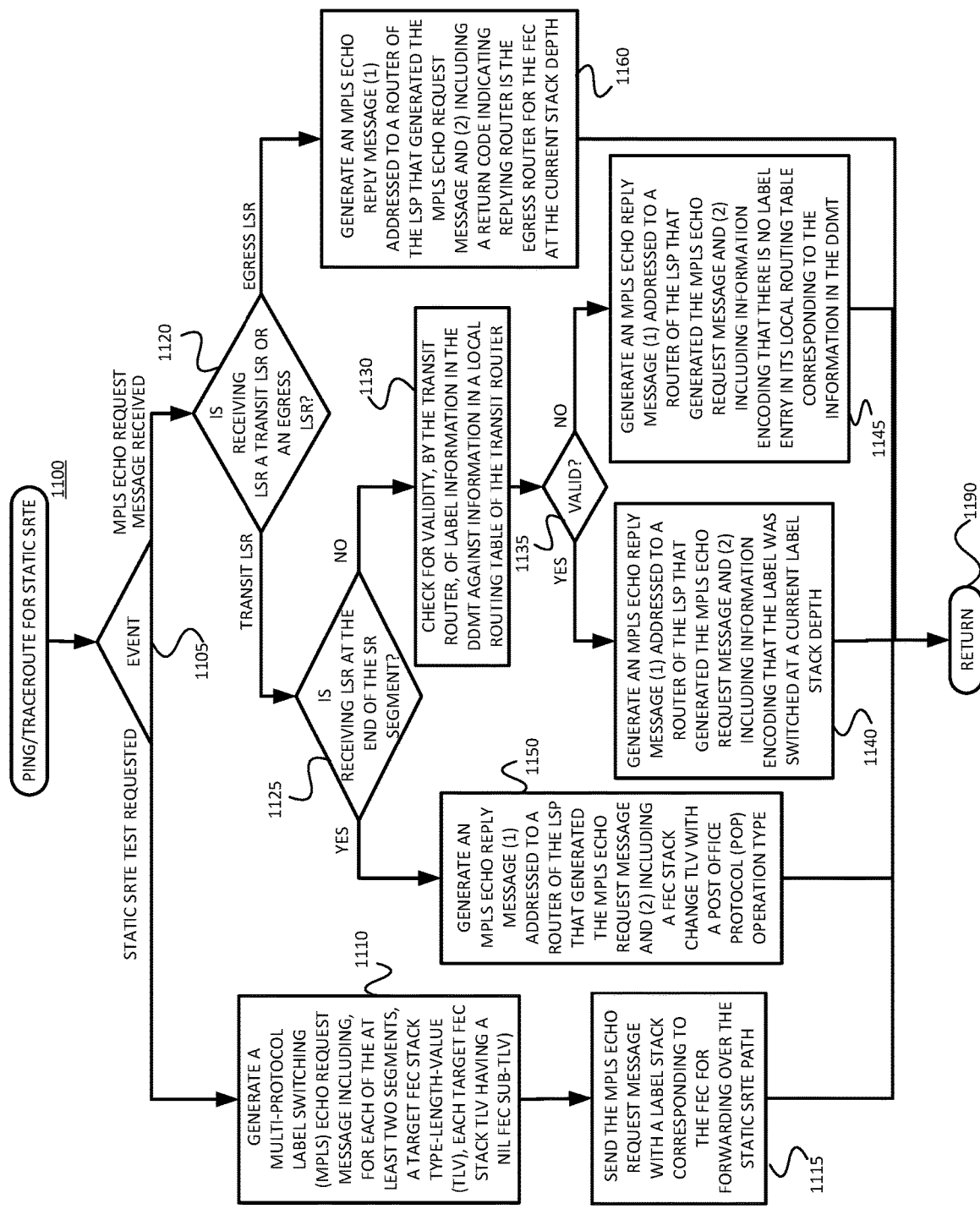
FIG. 11 is a flow diagram of an example method for performing a ping or traceroute operation in a statically configured SRTE path, in a manner consistent with the present description.

FIG. 11 is a flow diagram of an example method 1100 for performing an MPLS Ping or Traceroute operation on a segment routing traffic engineered (SRTE) path over which packets belonging to a forwarding equivalency class (FEC) are forwarded. Different branches of the method 1100 are performed in response to the occurrence of different events. (Event branch point 1105) Note that different parts of the example method 1100 may be performed, in a distributed manner, by a number of communications network devices such as, for example, an ingress router of an SR tunnel being tested, a transit router of the SR tunnel being tested and an egress router of the SR tunnel being tested (all generally referred to as label-switching routers or LSRs).

Referring to event branch point 1105, the left branch of the example method 1100 is performed (e.g., by the ingress router) in response to receiving a request for a static SRTE path test. As shown, the example method 1100 generates a multi-protocol label switching (MPLS) echo request message including, for each of the at least two segments, a target FEC stack type-length-value (TLV), each target FEC stack TLV having a Nil FEC sub-TLV). (Block 1110) Recall that for a ping test, the TTL value (Recall, e.g., field 826 of the IP datagram header 810 of FIG. 8) is set to 255 (or some value large enough to reach the end of the static SRTE path being tested). On the other hand, for a traceroute test, the TTL value is set to one (1) and is successively incremented as the test progresses down the static SRTE path being tested. Next, the example method 1100 sends the MPLS echo request message with a label stack corresponding to the FEC for forwarding over the static SRTE path. (Block 1115) The example method 1100 is then left. (Return Node 1190).

Referring back to event branch point 1105, the center or right branch of the example method 1100 is performed in response to receipt of an MPLS echo request. The example method 1100 determines whether the receiving LSR is a transit LSR or an egress LSR of the SRTE path being tested. If the receiving LSR is a transit LSR of the SRTE path being tested, the center branch of example method 1100 is performed. (Left branch of 1120) More specifically, the example method 1100 next determines whether or not the receiving LSR is at the end of an SR segment. If not (Decision 1125, right branch) the transit LSR checks for validity of label information in a downstream detailed mapping TLV (DDMT) against information in a local routing table of the transit router. (Block 1130) Responsive to a determination, by the transit router, that the label information in the DDMT checked against information the local router table of the transit router is valid (Decision 1135, YES), the example method 1100 generates an MPLS echo reply message (1) addressed to a router of the LSP that generated the MPLS echo request message and (2) including information encoding that the label was switched at a label stack depth received in the MPLS Echo Request. (Block 1140) The example method 1100 is then left. (Return Node 1190) If, on the other hand, it is determined that the information in the DDMT checked against information in a local routing table of the transit router is invalid (Decision 1135, NO), the example method 1100 generates an MPLS echo reply message (1) addressed to a router of the LSP that generated the MPLS echo request message and (2) including information encoding that there is no label entry in its local routing table corresponding to the information in the DDMT. (Block 1145) The example method 1100 is then left. (Return Node 1190)

Referring back to decision 1120, since static segments won't have a FEC, control-plane verification cannot be used to determine whether or not the node is a transit node. To determine whether the node is transit node or the egress node, the node can lookup the received label in DDMT TLV and find the corresponding control-plane state. If the received DDMT label is "3" or "0", then the node will be the egress node for the segment; otherwise, the node may be a transit node for the segment. In the case of UHP, the received egress label in DDMT TLV can be verified by the protocol that has advertised that egress label.

Referring back to decision 1125, if the MPLS Echo Request was received by a router at the end of a current segment of the SRTE path (Decision 1125, YES), the example method 1100 generates an MPLS echo reply message (1) addressed to a router of the LSP that generated the MPLS echo request message and (2) including a FEC Stack change TLV with a post office protocol (POP) operation type. (Block 1150) (See, e.g., section 7.2 of RFC 8287.) The example method 1100 is then left. (Return Node 1190)

Finally, referring back to decision 1120, if the receiving LSR is the egress LSR of the SRTE path being tested (Decision 1120, right branch), the example method 1100 generates an MPLS echo reply message (1) addressed to a router of the LSP that generated the MPLS echo request message and (2) including a return code indicating that the replying router is the egress router for the FEC at the current stack depth. (Block 1160) The example method 1100 is then left. (Return Node 1190)

The foregoing methods 1000 and 1100 use NIL-FEC for tracing the static-LSP or static SRTE paths. These methods may otherwise use the procedures defined in RFC 8029 for tracing static MPLS tunnel (static LSPs) and RFC 8287 for tracing SRTE paths, with extensions and/or modification described below. First, for MPLS Ping for Static LSP or Static SRTE path using NIL-FEC, the initiator (e.g., the ingress LSR) should include a NIL FEC for entire label stack in the MPLS Echo request. (Recall, e.g., 1010 of FIG. 10 and 1110 of FIG. 11.)

For MPLS traceroute for Static LSP or Static SRTE path using NIL-FEC, the following extensions and/or modification may be used. The initiator (e.g., the ingress LSR) should include a NIL FEC corresponding to static label imposed in the label stack. In the case of a static LSP, the initiator will add one NIL FEC as per RFC 8029. (Recall, e.g., 1010 of FIG. 10.) In the case of a Static SRTE path, the initiator will include a NIL FEC for each label in the label stack as per RFC 8287. (Recall, e.g., 1110 of FIG. 11.)

Every transit node should validate the DDMT and label mapping entry in its local routing table for the label in DDMT label stack. (Recall, e.g., 1040 of FIG. 10 and 1130 of FIG. 11.) If LSR is unable to find the Label mapping entry in its incoming label mapping (ILM) table (e.g., mpls.0 table in some routers from Juniper Networks, Inc. of Sunnyvale, Calif.) then the LSR reports back with return code. More specifically, if there is no entry for received DDMT label, this indicates a label mis-forwarding or broken Static MPLS tunnel, and the LSR needs to report an error. (Recall, e.g., 1070 of FIG. 10 and 1145 of FIG. 11.) For example, the LSR may set the best-return-code to ("No label entry at stack-depth") and best-rtn-subcode to Label-stack-depth in the echo replay message (Recall, e.g., the DDMT TLV.), and then send the echo reply packet (e.g., per step 7 of RFC 8029). If, on the other hand, there is an entry for received DDMT label, the LSR may retrieve the associated label operation from the corresponding Next Hop Label Forwarding Entry (NHLFE) in its ILM, and respond to the initiator with best-rtn-subcode set to 8 (i.e., Label switched at stack-depth <RSC>). (Recall, e.g., 1060 of FIG. 10 and 1140 of FIG. 11.) Regarding the associated label operation, if the node is a transit node for the segment, then the ILM may be used to find a route with a swap or pop operation. If the node is the egress, the label received will be a special label like "3" or "0", which indicates the end of the segment in case of PHP. In case of UHP, the protocol which had advertised that egress label may be checked to verify that the node is indeed is an egress for the segment.

When an LSR receives the request with DDMT label value set to "implicit-NULL" or "explicit-NULL" or Egress label belongs to static protocol, then the node can respond as follows. If label-stack-depth is 0, the LSR needs to report that it is a tail end for the LSP, and will therefore set FEC-stack-depth to 1, set best-return-code to 3 ("Replying router is an egress for the FEC at stack-depth"), set best-rtn-subcode to the value of FEC-stack-depth (1), and send the response back to the initiator (e.g., ingress LSR). (Recall, e.g., 1080 of FIG. 10 and 1160 of FIG. 11.) Otherwise, if the LSR are is not the ultimate egress for the path being traced, LSR should nonetheless report that it is the end of the outer tunnel or segment being traced (e.g., by replying with FEC stack change TLV with POP (outer tunnel). (Recall, e.g., 1150 of FIG. 11.)

§ 4.1.1 Example Ways to Encode a FEC TLV and Sub-TLVS

Figure 12:
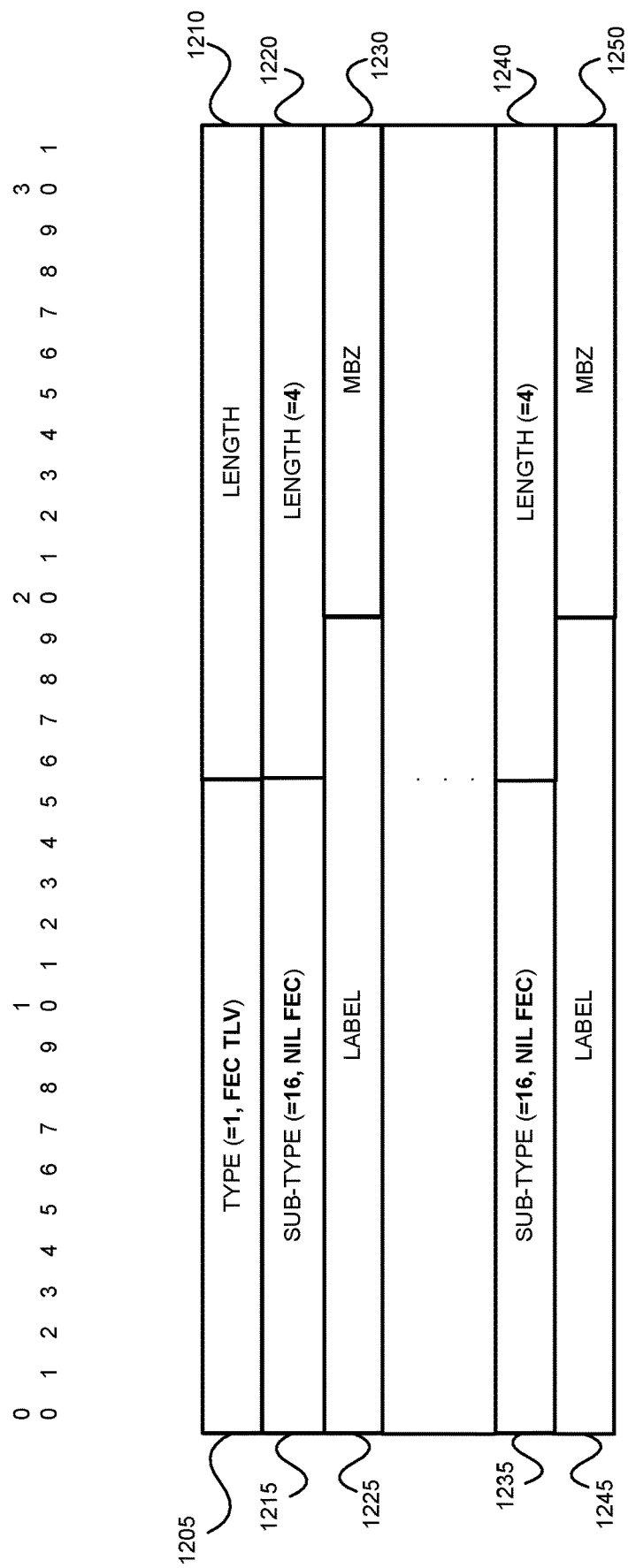
FIG. 12 illustrates an example data structure, such as TLV(s) and sub-TLV(s) for example, for carrying information in an MPLS Echo Request or Reply in a manner consistent with the present description.

Referring back to block 1010 of FIG. 10 and 1110 of FIG. 11, in one example embodiment, the fact that an LSR or SRTE path is static may be encoded as shown in FIG. 12. More specifically, FIG. 12 illustrates an example target FEC stack data structure 1200 consistent with section 3.2 of RFC 8029. The example data structure 1200 has a 16-bit type field 1205, a 16-bit length field 1210, a 16-bit sub-type field 1215, a 16-bit length (e.g., of the first sub-type) field 1220, a 20-bit label field 1225 and a 12-bit must be zero (MBZ) field 1230. Zero or more additional sub-TLV(s) may each include a 16-bit type field 1235, a 16-bit length field 1240, a 20-bit label field 1245, a 12-bit MBZ field 1250. Per section 3 of RFC 8029, the 16-bit type field 1205 is set to 1 (indicating that the TLV is a target FEC stack), the 16-bit sub-type field 1215 is set to 16 (indicating that the sub-TLV is Nil FEC), the 16-bit length field 1220 is set to 4 (indicating a length of 4 octets). Zero or more additional sub-TLVs (1235+1240+ 1245+1250) may include additional Nil FEC labels as shown.

Figure 9:
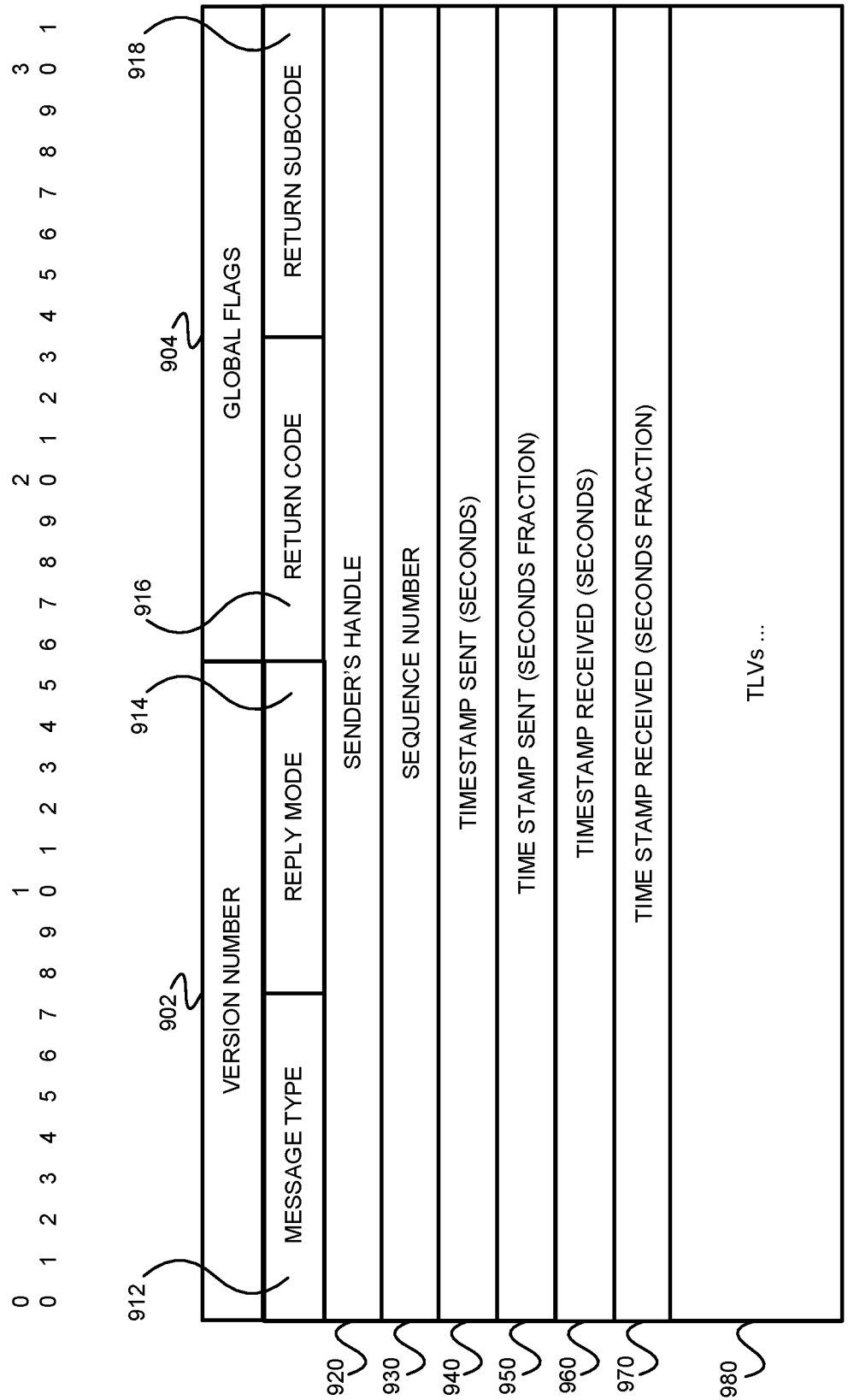
FIG. 9 illustrates an example data structure of an MPLS Echo Request or Reply.

Referring back to FIG. 9, the TLVs 980 may also include downstream detailed mapping TLV (DDMT), where type may be set to 20 per section 3 of RFC 8029, and details of the DDMT may be in accordance with section 3.4 of RFC 8029. The DDMT may include an 8-bit return code and an 8-bit return subcode. Return code values may be set per section 3.1 of RFC 8029.

For example, referring back to block 1060 of FIG. 10 and block 1140 of FIG. 11, information encoding that the label was switched (at the current label stack depth) may be encoded by setting the return code to 8 and the return subcode (<RSC>) to the stack depth.

Referring back to block 1070 of FIG. 10 and block 1145 of FIG. 11, information encoding that there is no label entry in the LSR's local routing table corresponding to the information in the DDMT in the received MPLS Echo Request may be encoded by setting the return code to 11 and the <RSC> to the stack depth.

Finally, referring back to block 1080 of FIG. 10 and block 1160 of FIG. 11, information enclosing that the replying router is an egress router for the FEC may be encoded by setting the return code to 3 and the <RSC> to the stack depth.

§ 4.1.2 Example Way to Determine Whether an LSR is a Transit LSR or Egress LSR Referring back to decision block 1030 of FIG. 10 and decision block 1120 of FIG. 11, whether or not the receiving LSR is a transit LSR or an egress LSR may be determined using procedures in RFC 8029 and/or RFC 8287. MPLS tunnels can be PHP or UHP tunnels. Also, MPLS tunnels supports implicit-NULL and Explicit-NULL. In these cases, the label value for the egress node would be different. Example embodiments consistent with the present description may rely on the label value received in DDMT to find whether a node is transit or egress.

§ 4.2 Example Apparatus

Figure 13:
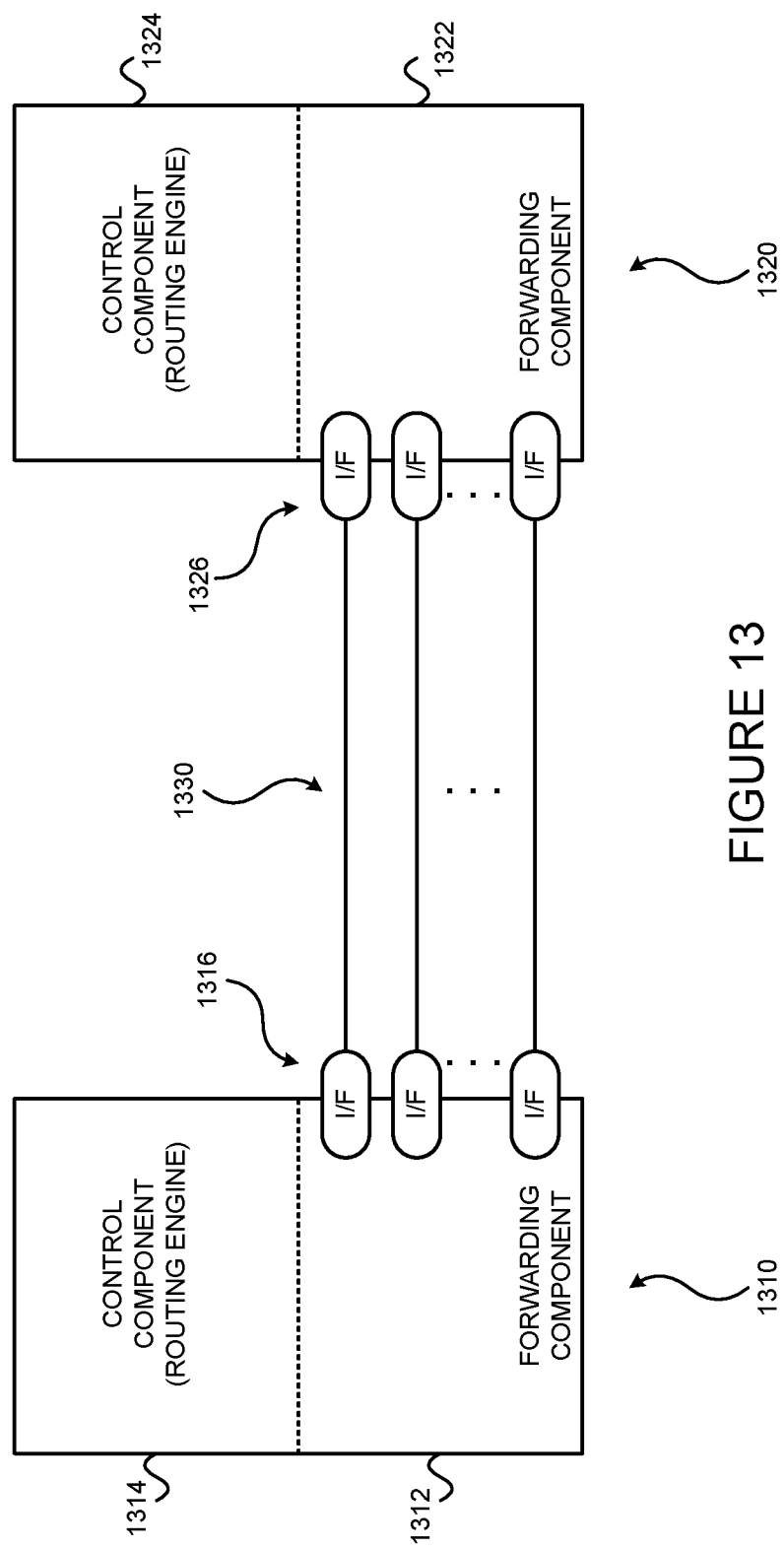
FIG. 13 illustrates an example environment including two systems coupled via communications links.

FIG. 13 illustrates two data forwarding systems 1310 and 1320 coupled via communications links 1330. The links may be physical links or "wireless" links. The data forwarding systems 1310,1320 may be nodes, such as routers for example. If the data forwarding systems 1310,1320 are example routers, each may include a control component (e.g., a routing engine) 1314,1324 and a forwarding component 1312,1322. Each data forwarding system 1310,1320 includes one or more interfaces 1316,1326 that terminate one or more communications links 1330. Any two of the label switched routers (LSRs) may be implemented on device 1310 and/or 1320. The example method 1000 and/or 1100 described above may be implemented in the control component 1314 and/or 1324 of device 1310 and/or 1320.

As just discussed above, and referring to FIG. 14, some example routers 1400 include a control component (e.g., routing engine) 1410 and a packet forwarding component (e.g., a packet forwarding engine) 1490.

The control component 1410 may include an operating system (OS) kernel 1420, routing protocol process(es) 1430, label-based forwarding protocol process(es) 1440, interface process(es) 1450, user interface (e.g., command line interface) process(es) 1460, and chassis process(es) 1470, and may store routing table(s) 1439, label forwarding information 1445, and forwarding (e.g., route-based and/or label-based) table(s) 1480. As shown, the routing protocol process(es) 1430 may support routing protocols such as the routing information protocol ("RIP") 1431, the intermediate system-to-intermediate system protocol ("IS-IS") 1432, the open shortest path first protocol ("OSPF") 1433, the enhanced interior gateway routing protocol ("EIGRP") 1434 and the border gateway protocol ("BGP") 1435, and the label-based forwarding protocol process(es) 1440 may support protocols such as BGP 1435, the label distribution protocol ("LDP") 1436 and the resource reservation protocol ("RSVP") 1437. One or more components (not shown) may permit a user 1465 to interact with the user interface process(es) 1460. Similarly, one or more components (not shown) may permit an outside device to interact with one or more of the router protocol process(es) 1430, the label-based forwarding protocol process(es) 1440, the interface process(es) 1450, and the chassis process(es) 1470, via SNMP 1485, and such processes may send information to an outside device via SNMP 1485.

The packet forwarding component 1490 may include a microkernel 1492, interface process(es) 1493, distributed ASICs 1494, chassis process(es) 1495 and forwarding (e.g., route-based and/or label-based) table(s) 1496.

Figure 14:
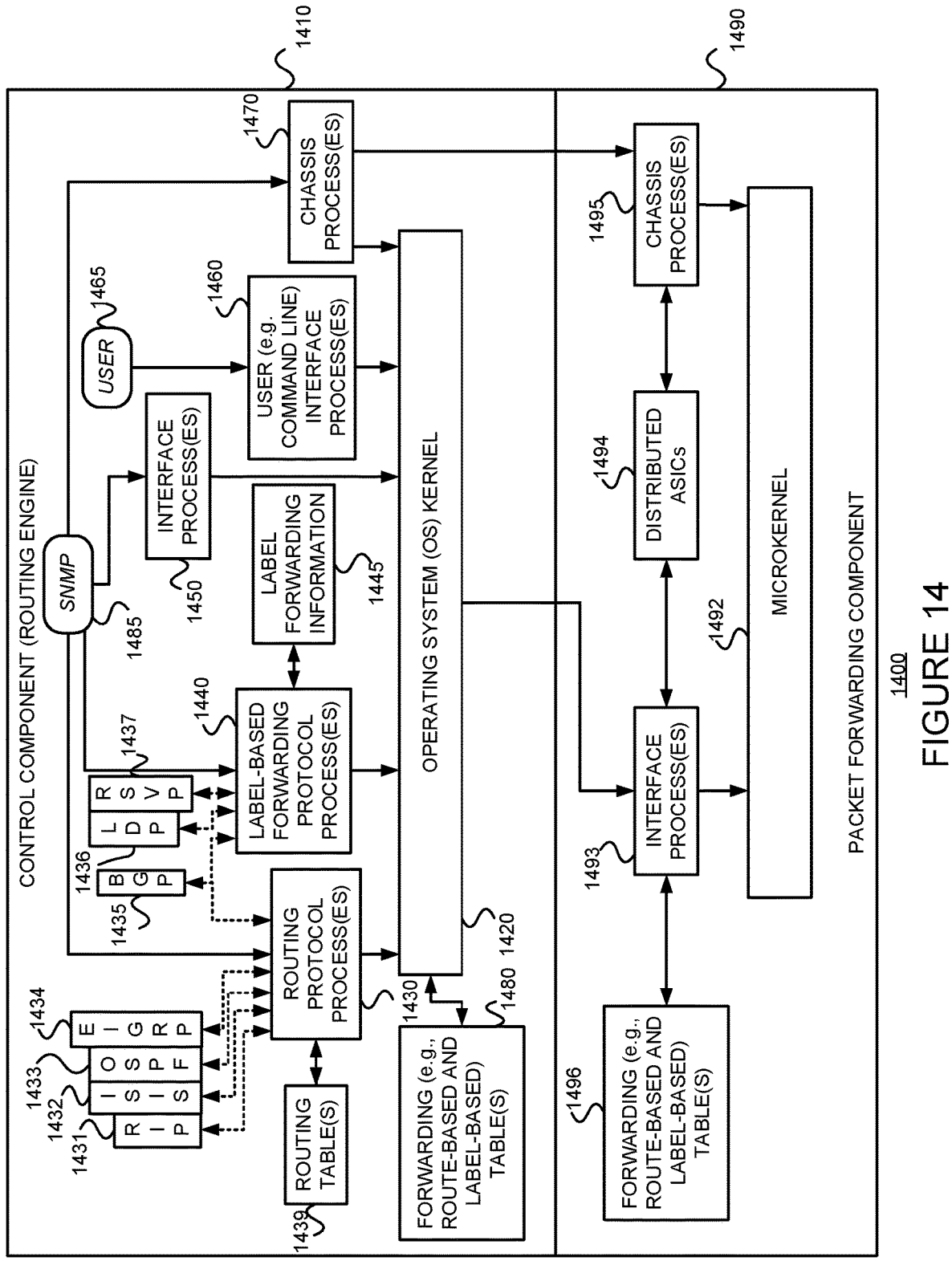
FIG. 14 is a block diagram of an example router on which the example methods of the present description may be implemented.

In the example router 1400 of FIG. 14, the control component 1410 handles tasks such as performing routing protocols, performing label-based forwarding protocols, control packet processing, etc., which frees the packet forwarding component 1490 to forward received packets quickly. That is, received control packets (e.g., routing protocol packets and/or label-based forwarding protocol packets) are not fully processed on the packet forwarding component 1490 itself, but are passed to the control component 1410, thereby reducing the amount of work that the packet forwarding component 1490 has to do and freeing it to process packets to be forwarded efficiently. Thus, the control component 1410 is primarily responsible for running routing protocols and/or label-based forwarding protocols, maintaining the routing tables and/or label forwarding information, sending forwarding table updates to the packet forwarding component 1490, and performing system management. The example control component 1410 may handle routing protocol packets, provide a management interface, provide configuration management, perform accounting, and provide alarms. The processes 1430, 1440, 1450, 1460 and 1470 may be modular, and may interact with the OS kernel 1420. That is, nearly all of the processes communicate directly with the OS kernel 1420. Using modular software that cleanly separates processes from each other isolates problems of a given process so that such problems do not impact other processes that may be running. Additionally, using modular software facilitates easier scaling.

Still referring to FIG. 14, the example OS kernel 1420 may incorporate an application programming interface ("API") system for external program calls and scripting capabilities. The control component 1410 may be based on an Intel PCI platform running the OS from flash memory, with an alternate copy stored on the router's hard disk. The OS kernel 1420 is layered on the Intel PCI platform and establishes communication between the Intel PCI platform and processes of the control component 1410. The OS kernel 1420 also ensures that the forwarding tables 1496 in use by the packet forwarding component 1490 are in sync with those 1480 in the control component 1410. Thus, in addition to providing the underlying infrastructure to control component 1410 software processes, the OS kernel 1420 also provides a link between the control component 1410 and the packet forwarding component 1490.

Referring to the routing protocol process(es) 1430 of FIG. 14, this process(es) 1430 provides routing and routing control functions within the platform. In this example, the RIP 1431, ISIS 1432, OSPF 1433 and EIGRP 1434 (and BGP 1435) protocols are provided. Naturally, other routing protocols may be provided in addition, or alternatively. Similarly, the label-based forwarding protocol process(es) 1440 provides label forwarding and label control functions. In this example, the LDP 1436 and RSVP 1437 (and BGP 1435) protocols are provided. Naturally, other label-based forwarding protocols (e.g., MPLS) may be provided in addition, or alternatively. In the example router 1400, the routing table(s) 1439 is produced by the routing protocol process(es) 1430, while the label forwarding information 1445 is produced by the label-based forwarding protocol process(es) 1440.

Still referring to FIG. 14, the interface process(es) 1450 performs configuration of the physical interfaces (Recall, e.g., 1416 and 1426 of FIG. 14) and encapsulation.

The example control component 1410 may provide several ways to manage the router. For example, it 1410 may provide a user interface process(es) 1460 which allows a system operator 1465 to interact with the system through configuration, modifications, and monitoring. The SNMP 1485 allows SNMP-capable systems to communicate with the router platform. This also allows the platform to provide necessary SNMP information to external agents. For example, the SNMP 1485 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 1410, thereby avoiding slowing traffic forwarding by the packet forwarding component 1490.

Although not shown, the example router 1400 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 1460 via a console port, an auxiliary port, and/or a management Ethernet port. As noted, the interval may be configured using the CLI.

The packet forwarding component 1490 is responsible for properly outputting received packets as quickly as possible. If there is no entry in the forwarding table for a given destination or a given label and the packet forwarding component 1490 cannot perform forwarding by itself, it 1490 may send the packets bound for that unknown destination off to the control component 1410 for processing. The example packet forwarding component 1490 is designed to perform Layer 2 and Layer 3 switching, route lookups, and rapid packet forwarding.

As shown in FIG. 14, the example packet forwarding component 1490 has an embedded microkernel 1492, interface process(es) 1493, distributed ASICs 1494, and chassis process(es) 1495, and stores a forwarding (e.g., route-based and/or label-based) table(s) 1496. The microkernel 1492 interacts with the interface process(es) 1493 and the chassis process(es) 1495 to monitor and control these functions. The interface process(es) 1492 has direct communication with the OS kernel 1420 of the control component 1410. This communication includes forwarding exception packets and control packets to the control component 1410, receiving packets to be forwarded, receiving forwarding table updates, providing information about the health of the packet forwarding component 1490 to the control component 1410, and permitting configuration of the interfaces from the user interface (e.g., CLI) process(es) 1460 of the control component 1410. The stored forwarding table(s) 1496 is static until a new one is received from the control component 1410. The interface process(es) 1493 uses the forwarding table(s) 1496 to look up next-hop information. The interface process(es) 1493 also has direct communication with the distributed ASICs 1494. Finally, the chassis process(es) 1495 may communicate directly with the microkernel 1492 and with the distributed ASICs 1494.

In the example router 1400, the example method 1000 and/or 1100 consistent with the present disclosure may be implemented in the control component 1410.

Figure 15:
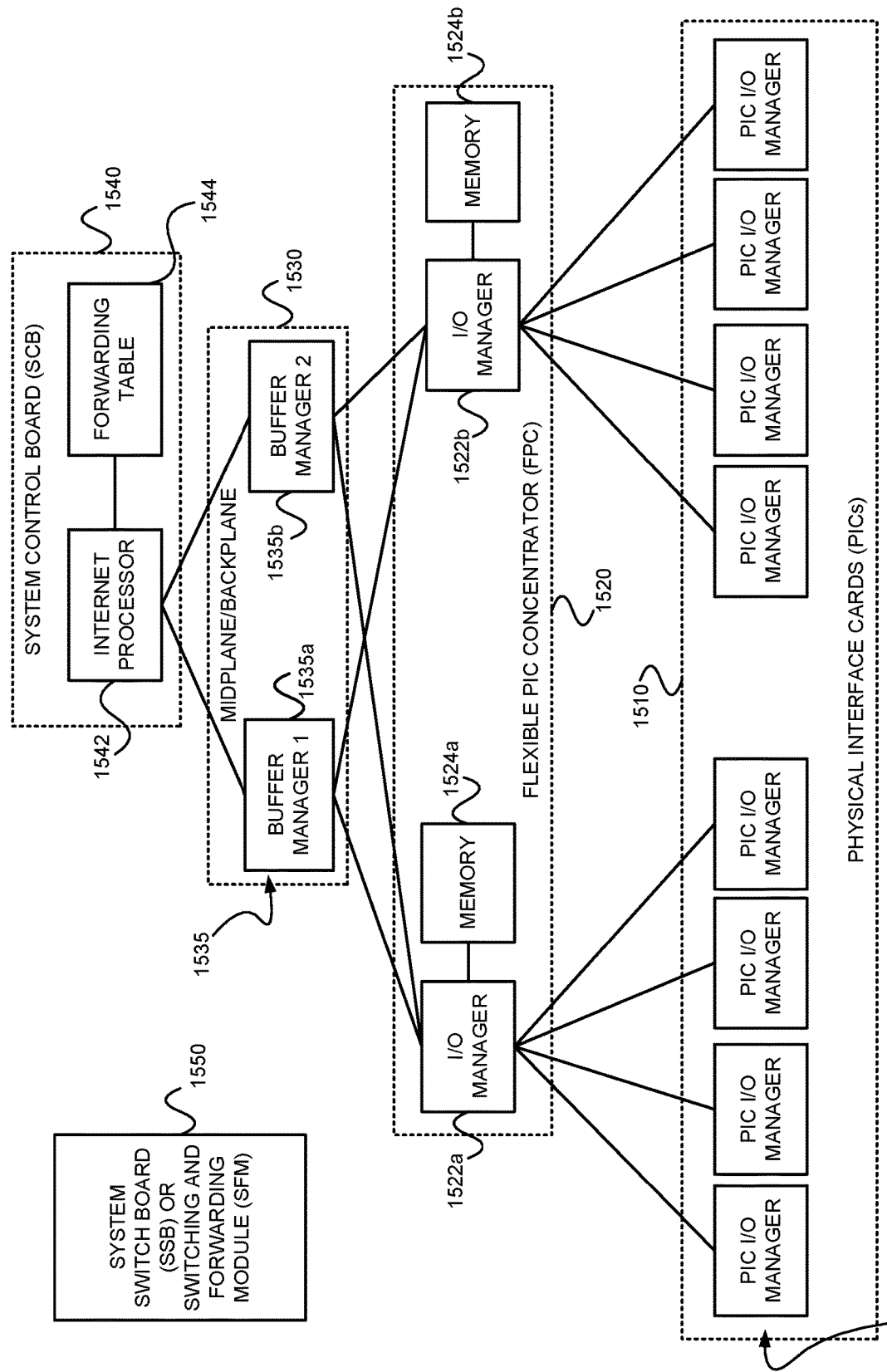
FIG. 15 is a block diagram of example distributed application specific integrated circuits ("ASICs") that may be provided in the example router of FIG. 14.

Referring back to distributed ASICs 1494 of FIG. 14, FIG. 15 is an example of how the ASICS may be distributed in the packet forwarding component 1490 to divide the responsibility of packet forwarding. As shown in FIG. 15, the ASICs of the packet forwarding component 1490 may be distributed on physical interface cards ("PICs") 1510, flexible PIC concentrators ("FPCs") 1520, a midplane or backplane 1530, and a system control board(s) 1540 (for switching and/or forwarding). Switching fabric is also shown as a system switch board ("SSB"), or a switching and forwarding module ("SFM") 1550. Each of the PICs 1510 includes one or more PIC I/O managers 1515. Each of the FPCs 1520 includes one or more I/O managers 1522, each with an associated memory 1524. The midplane/backplane 1530 includes buffer managers 1535a, 1535b. Finally, the system control board 1540 includes an Internet processor 1542 and an instance of the forwarding table 1544 (Recall, e.g., 1496 of FIG. 14).

Still referring to FIG. 15, the PICs 1510 contain the interface ports. Each PIC 1510 may be plugged into an FPC 1520. Each individual PIC 1510 may contain an ASIC that handles media-specific functions, such as framing or encapsulation. Some example PICs 1510 provide SDH/SONET, ATM, Gigabit Ethernet, Fast Ethernet, and/or DS3/E3 interface ports.

An FPC 1520 can contain from one or more PICs 1510, and may carry the signals from the PICs 1510 to the midplane/backplane 1530 as shown in FIG. 15.

The midplane/backplane 1530 holds the line cards. The line cards may connect into the midplane/backplane 1530 when inserted into the example router's chassis from the front. The control component (e.g., routing engine) 1410 may plug into the rear of the midplane/backplane 1530 from the rear of the chassis. The midplane/backplane 1530 may carry electrical (or optical) signals and power to each line card and to the control component 1410.

The system control board 1540 may perform forwarding lookup. It 1540 may also communicate errors to the routing engine. Further, it 1540 may also monitor the condition of the router based on information it receives from sensors. If an abnormal condition is detected, the system control board 1540 may immediately notify the control component 1410.

Figure 16A:
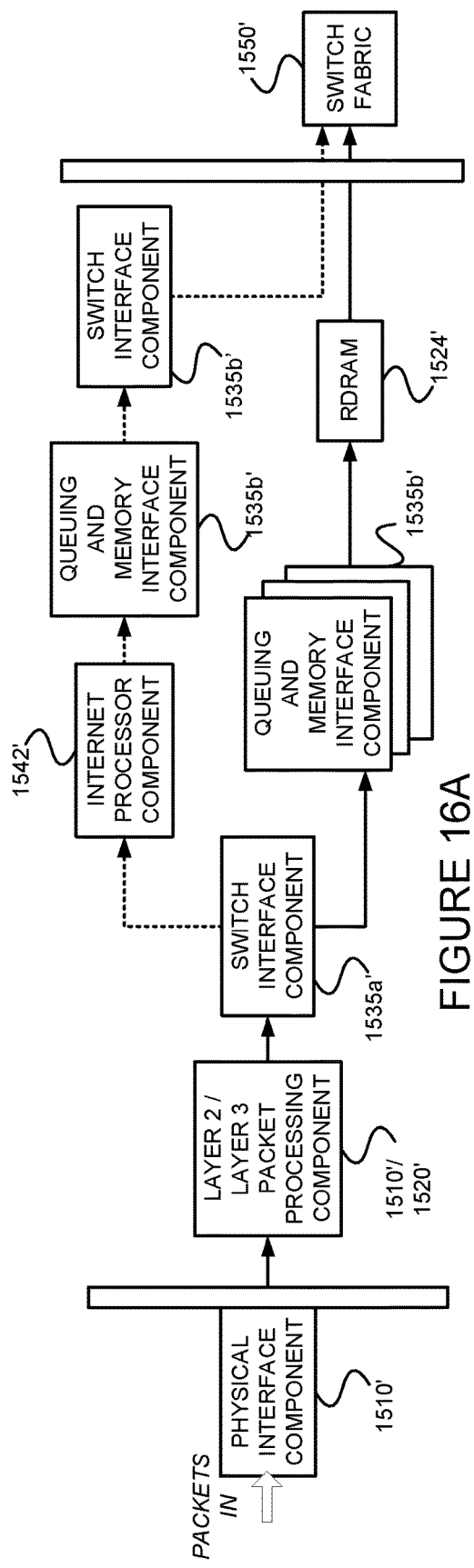
FIGS. 16A and 16B illustrate example packet forwarding operations of the example distributed ASICs of FIG. 15.
Figure 16B:
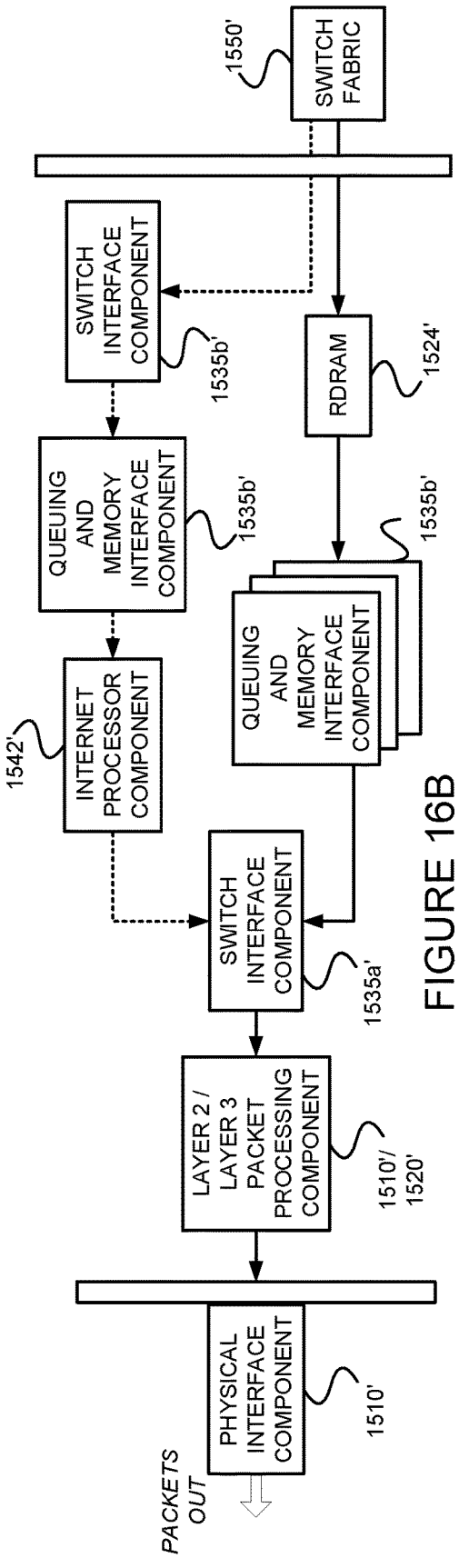

Referring to FIGS. 15, 16A and 16B, in some exemplary routers, each of the PICs 1510,1410' contains at least one I/O manager ASIC 1515 responsible for media-specific tasks, such as encapsulation. The packets pass through these I/O ASICs on their way into and out of the router. The I/O manager ASIC 1515 on the PIC 1510,1410' is responsible for managing the connection to the I/O manager ASIC 1522 on the FPC 1520,1420', managing link-layer framing and creating the bit stream, performing cyclical redundancy checks (CRCs), and detecting link-layer errors and generating alarms, when appropriate. The FPC 1520 includes another I/O manager ASIC 1522. This ASIC 1522 takes the packets from the PICs 1510 and breaks them into (e.g., 64-byte) memory blocks. This FPC I/O manager ASIC 1522 sends the blocks to a first distributed buffer manager (DBM) 1535a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 1535a' manages and writes packets to the shared memory 1524 across all FPCs 1520. In parallel, the first DBM ASIC 1535*a*' also extracts information on the destination of the packet and passes this forwarding-related information to the Internet processor 1542/1442'. The Internet processor 1542/1442' performs the route lookup using the forwarding table 1544 and sends the information over to a second DBM ASIC 1535*b*'. The Internet processor ASIC 1542/1442' also collects exception packets (i.e., those without a forwarding table entry) and sends them to the control component 1410. The second DBM ASIC 1535*b*' then takes this information and the 64-byte blocks and forwards them to the I/O manager ASIC 1522 of the egress FPC 1520/1420' (or multiple egress FPCs, in the case of multicast) for reassembly. (Thus, the DBM ASICs 1535*a*' and 1535*b*' are responsible for managing the packet memory 1524 distributed across all FPCs 1520/1420', extracting forwarding-related information from packets, and instructing the FPC where to forward packets.)

The I/O manager ASIC 1522 on the egress FPC 1520/1420' may perform some value-added services. In addition to incrementing time to live ("TTL") values and re-encapsulating the packet for handling by the PIC 1510, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1522 on the egress FPC 1520/1420' may be responsible for receiving the blocks from the second DBM ASIC 1535*b*', incrementing TTL values, queuing a pointer to the packet, if necessary, before applying CoS rules, re-encapsulating the blocks, and sending the encapsulated packets to the PIC I/O manager ASIC 1515.

Figure 17:
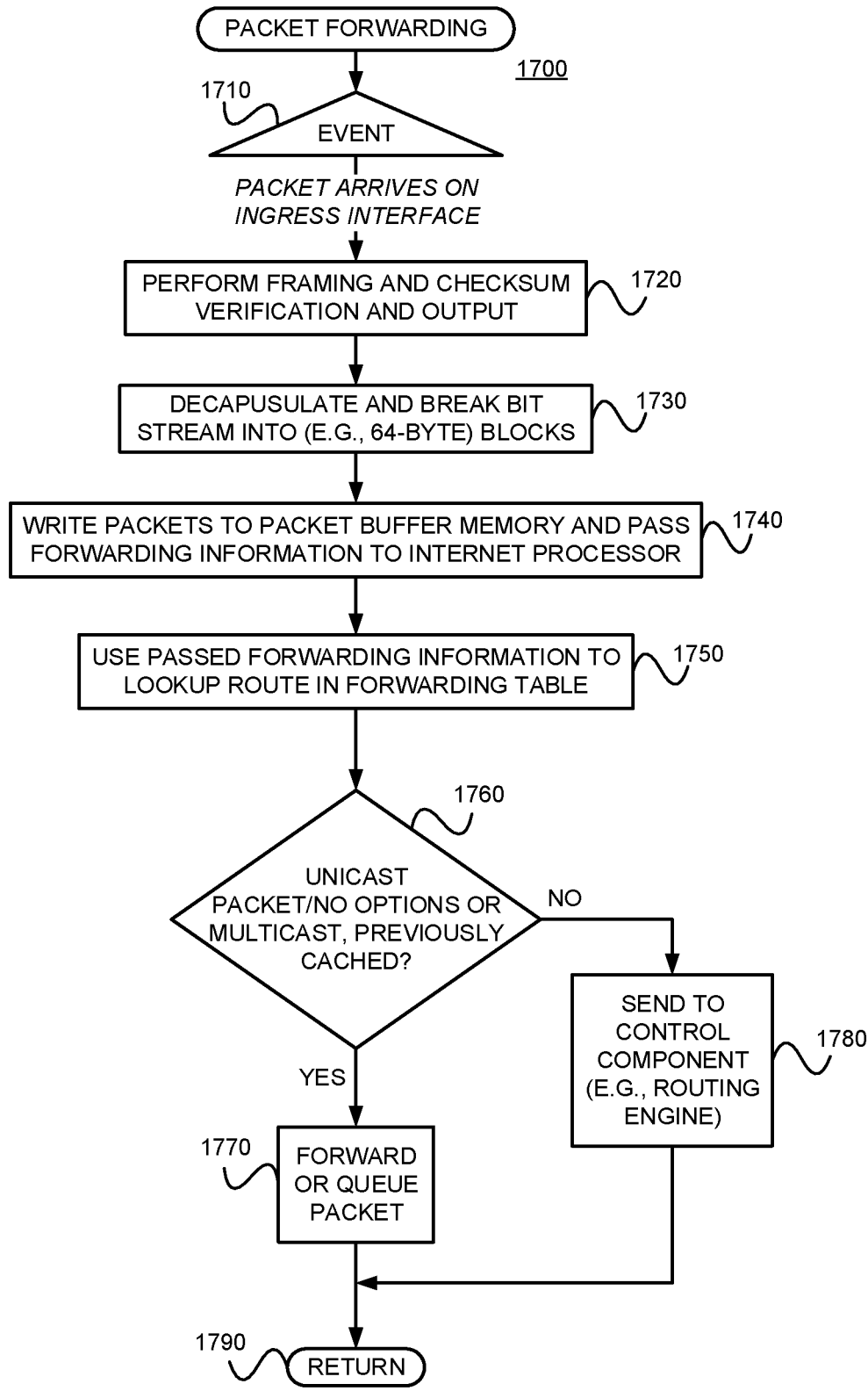
FIG. 17 is a flow diagram of an example packet forwarding method that may be implemented on any of the example routers of FIGS. 14 and 15.

FIG. 17 is a flow diagram of an example method 1700 for providing packet forwarding in the example router. The main acts of the method 1700 are triggered when a packet is received on an ingress (incoming) port or interface. (Event 1710) The types of checksum and frame checks that are required by the type of medium it serves are performed and the packet is output, as a serial bit stream. (Block 1720) The packet is then decapsulated and parsed into (e.g., 64-byte) blocks. (Block 1730) The packets are written to buffer memory and the forwarding information is passed on the Internet processor. (Block 1740) The passed forwarding information is then used to lookup a route in the forwarding table. (Block 1750) Note that the forwarding table can typically handle unicast packets that do not have options (e.g., accounting) set, and multicast packets for which it already has a cached entry. Thus, if it is determined that these conditions are met (YES branch of Decision 1760), the packet forwarding component finds the next hop and egress interface, and the packet is forwarded (or queued for forwarding) to the next hop via the egress interface (Block 1770) before the method 1700 is left (Node 1790) Otherwise, if these conditions are not met (NO branch of Decision 1760), the forwarding information is sent to the control component 1410 for advanced forwarding resolution (Block 1780) before the method 1700 is left (Node 1790).

Referring back to block 1770, the packet may be queued. Actually, as stated earlier with reference to FIG. 15, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1522 may send a request for the packet to the second DBM ASIC 1535*b*. The DBM ASIC 1535 reads the blocks from shared memory and sends them to the I/O manager ASIC 1522 on the FPC 1520, which then serializes the bits and sends them to the media-specific ASIC of the egress interface. The I/O manager ASIC 1515 on the egress PIC 1510 may apply the physical-layer framing, perform the CRC, and send the bit stream out over the link.

Referring back to block 1780 of FIG. 17, as well as FIG. 15, regarding the transfer of control and exception packets, the system control board 1540 handles nearly all exception packets. For example, the system control board 1540 may pass exception packets to the control component 1410.

Although example embodiments consistent with the present disclosure may be implemented on the example routers of FIG. 13 or 14, embodiments consistent with the present disclosure may be implemented on communications network nodes (e.g., routers, switches, etc.) having different architectures. For example, methods consistent with the present description may be run on any modern server, or even a virtual machine (e.g., without any ASICs or packet forwarding engines). More generally, embodiments consistent with the present disclosure may be implemented on an example system 1800 as illustrated on FIG. 18.

Figure 18:
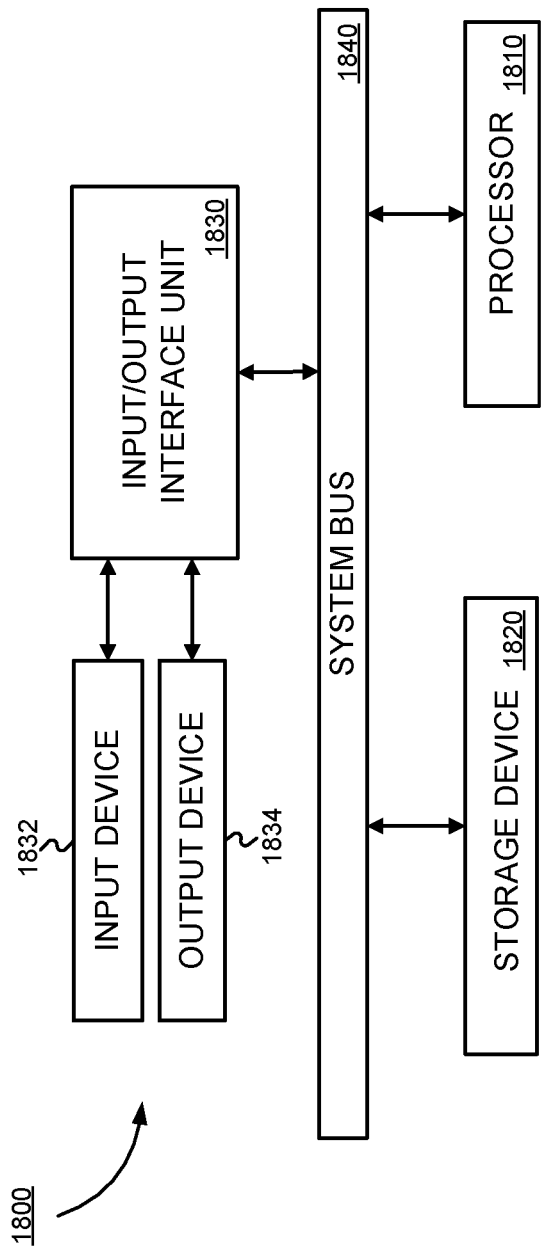
FIG. 18 is a block diagram of an example processor-based system that may be used to execute the example methods and/or to store information used and/or generated by such example methods.

FIG. 18 is a block diagram of an exemplary machine 1800 that may perform one or more of the methods described, and/or store information used and/or generated by such methods. The exemplary machine 1800 includes one or more processors 1810, one or more input/output interface units 1830, one or more storage devices 1820, and one or more system buses and/or networks 1840 for facilitating the communication of information among the coupled elements. One or more input devices 1832 and one or more output devices 1834 may be coupled with the one or more input/output interfaces 1830. The one or more processors 1810 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1820 and/or may be received from an external source via one or more input interface units 1830. The machine executable instructions may be stored as various software modules, each module performing one or more operations. Functional software modules are examples of components, which may be used in the apparatus described.

In some embodiments consistent with the present disclosure, the processors 1810 may be one or more microprocessors and/or ASICs. The bus 1840 may include a system bus. The storage devices 1820 may include system memory, such as read only memory (ROM) and/or random access memory (RAM). The storage devices 1820 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.3 Example of Operations of an Example Method

Figure 19:
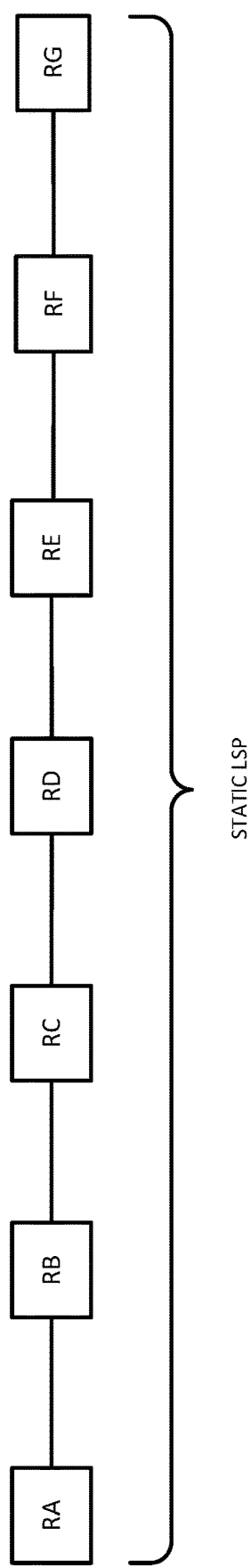
FIG. 19 illustrates an example of operations of the example method 1000 of FIG. 10.
Figure 20:
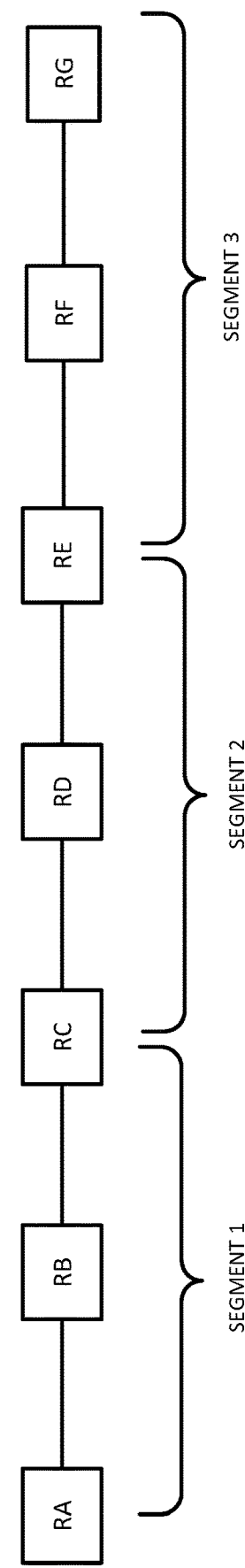
FIG. 20 illustrates an example of operations of the example method 1100 of FIG. 11.

This section, with reference to FIGS. 19 and 20, provides examples illustrating operations of the example methods 1000 and 1100 of FIGS. 10 and 11, respectively. In FIG. 19, a static LSP includes ingress router RA, egress router RG and intervening transit routers RB, RC, RD, RE and RF. Example traceroute and ping operations consistent with example method 1000 of FIG. 10 are now described.

First, regarding the example traceroute operation, RA initiates MPLS Echo request by adding a NIL FEC in the Target FEC stack TLV for Static LSP and DDMT label will be set to outgoing label used for forwarding. (Recall, e.g., 1010 of FIG. 10 and FIG. 12.)

RB receives the request and checks incoming label mapping (ILM) for the DDMT label received. If the entry is found, RB checks the label operation associated with the label. If RB is a transit router, it will respond with return code "label switched" at stack-depth <RSC> (8). (Recall, e.g., 1040, 1050 YES and 1060 of FIG. 10.) These operations are repeated on RC, RD, RE and RF.

Finally, egress router RG receives the MPLS echo request and checks the DDMT label received. RG would have received "implicit-NULL" or "explicit-NULL" or "Egress label". Since RG received the MPLS echo request with a label-stack-depth of 0, it should respond with return code "Replying router is an egress for the FEC at stack-depth" (3). (Recall, e.g., 1080 of FIG. 10.)

Now, regarding the example MPLS ping operation, ingress router RA initiates MPLS echo request by adding a NIL FEC in the Target FEC stack TLV. (Recall, e.g., 1010 of FIG. 10 and FIG. 12.) RA sets the TTL to 255 (or some other value sufficient to reach the end of the LSP) in MPLS header and sends the MPLS echo request. (Recall, e.g., 1020 of FIG. 10.) Since the egress router RG receives the MPLS Echo request with a label-stack-depth of 0, it should respond with return code "Replying router is an egress for the FEC at stack-depth" (3). (Recall, e.g., 1080 of FIG. 10.)

In FIG. 20, an SRTE path includes three (3) segments; segment 1 includes RA, RB and RC, segment 2 includes RC, RD and RE, and segment 3 includes RE, RF and RG. Example traceroute and ping operations consistent with example method 1100 of FIG. 11 are now described.

First, regarding the example traceroute operation, RA initiates an MPLS echo request by adding a NIL FEC corresponds to each label in the label stack in the Target FEC stack TLV for Static SRTE-path and sets the DDMT label to the outgoing label used for forwarding. More specifically, RA sends an MPLS echo request with three NIL FECs, one corresponding to each of the static SR segments. The TTL of the MPLS echo request may be set to 1.

RB receives the MPLS echo request and checks its ILM for the DDMT label received. If the entry is found, RB checks the label operation associated with the label. If RB is transit LSR, RB responds with return code "label switched" at stack-depth <RSC> (8). (Recall, e.g., 1120, 1125 NO, 1130, 1135 YES and 1140.) The ingress RA will process the received MPLS echo reply and generate a new MPLS echo request with the TTL incremented (e.g., set to 2) When RC receives the MPLS Echo Request, it checks the DDMT label received. RC would have received "implicit-NULL" or "explicit-NULL" or "Egress label". Since RC received request with label-stack-depth is 2, it should respond with return code "See DDMAP TLV for meaning of Return Code and Return Subcode" (14). RC should reply with FEC stack change TLV with POP. /*Current segment being traced.*/ (Recall, e.g., 1120, 1125 YES, and 1150 of FIG. 11.) When ingress router RA receives the MPLE echo reply from RC, it removes the Nil from top of the FEC stack and continues tracing (e.g., by incrementing the TTL) for the rest of the segments.

More specifically, when RD receives the MPLS echo request, it will check its ILM for the DDMT label received. If the entry is found, RD will check the label operation associated with the label. If RD is a transit LSR, it will respond with return code "label switched" at stack-depth <RSC> (8). (Recall, e.g., 1120, 1125 NO, 1130, 1135 YES and 1140.) RD will then send the MPLS echo reply back to the ingress router RA. RA will then generate an MPLS echo request with an incremented TTL. When RE receives the MPLS echo request, it checks the DDMT label received. RE would have received "implicit-NULL" or "explicit-NULL" or "Egress label". Since RE received request with label-stack-depth is 2, RE should respond with return code "See DDMAP TLV for meaning of Return Code and Return Subcode" (14). RE should reply with FEC stack change TLV with POP. /*Current segment being traced.*/ (Recall, e.g., 1120, 1125 YES, and 1150 of FIG. 11.)

When RA receives the MPLS echo reply from RE, it removes the NIL from top of the FEC stack and continues tracing for the rest of the segments by successively incrementing the TTL. RF receives the MPLS echo request and checks its ILM for the DDMT label received. If the entry is found, it checks the label operation associated with the label. Since RF is a transit router, it responds with return code "label switched" at stack-depth <RSC> (8). (Recall, e.g., 1120, 1125 NO, 1130, 1135 YES and 1140.) RF then sends the MPLS echo reply back to the ingress router RA. RA then generates another MPLS echo request with the TTL incremented. Finally, when RG receives the MPLS echo request, it checks the DDMT label received. RG would have received "implicit-NULL" or "explicit-NULL" or "Egress label". Since RG received request with label-stack-depth is 0, RG should respond with return code "Replying router is an egress for the FEC at stack-depth" (3). (Recall, e.g., 1120 and 1160 of FIG. 11.)

Next, regarding the example ping operation, RA initiates an MPLS Echo Request by adding a NIL FEC in the Target FEC stack TLV. (Recall, e.g., FIGS. 12 and 1110 of FIG. 11.) RA then setting the TTL to 255 in the MPLS header of the labels in the label-stack and sends the MPLS echo request. (Recall, e.g., 1115 of FIG. 11.) Since the egress router RG receives the MPLS echo request with label-stack-depth is 0, it should respond with return code "Replying router is an egress for the FEC at stack-depth" (3). (Recall, e.g., 1160 of FIG. 11.)

§ 4.4 Refinements, Alternatives and Extensions

It is advantageous if the information in the MPLS echo requests and MPLS echo replies is encoded in a manner that will not disrupt normal operations of routers running a conventional version of MPLS LSP Trace Route operations (e.g., per RFC 8209 and/or RFC 8287).

§ 4.5 CONCLUSIONS

As should be appreciated from the foregoing, example embodiments consistent with the present description help test static LSPs and static SRTE paths.

What is claimed is:

1. A computer-implemented method for testing a static label-switched path (LSP) over which packets belonging to a forwarding equivalency class (FEC) are forwarded, the computer-implemented method comprising:
   a) generating a multi-protocol label switching (MPLS) echo request message including (1) a downstream detailed mapping TLV (DDMT), and (2) a target FEC stack type-length-value (TLV), the target FEC stack TLV having a Nil FEC sub-TLV;
   b) sending the MPLS echo request message with a label stack corresponding to the FEC for forwarding over the static LSP;
   c) receiving, by a transit router of the LSP, the MPLS echo request message;
   d) responsive to receiving the MPLS echo request message, checking for validity, by the transit router, label information in the DDMT against information in a local routing table of the transit router; and
   e) responsive to a determination, by the transit router, that the label information in the DDMT checked against information in a local routing table of the transit router is invalid,
      generating an MPLS echo reply message (1) addressed to a router of the LSP that generated the MPLS echo request message and (2) including information encoding that there is no label entry in its local routing table corresponding to the information in the DDMT, and
   otherwise, responsive to a determination, by the transit router, that the label information in the DDMT checked against information the local router table of the transit router is valid,
      generating an MPLS echo reply message (1) addressed to a router of the LSP that generated the MPLS echo request message and (2) including information encoding that the label was switched.

2. The computer-implemented method of claim 1 wherein the DDMT includes a label-stack sub-TLV.

3. The computer-implemented method of claim 1, further comprising:
   f) receiving, by an egress router of the static LSP, the MPLS echo request message; and
   g) generating an MPLS echo reply message (1) addressed to a router of the LSP that generated the MPLS echo request message and (2) including information encoding that replying router is an egress router for the FEC.

4. The computer-implemented method of claim 1, wherein the MPLS echo request message generated has an MPLS header with a time to live (TTL) value sufficient to reach an egress router of the static LSP.

5. The computer-implemented method of claim 4 wherein the TTL value is set to 255.

6. A computer-implemented method for use in a static segment routed traffic engineered (SRTE) path, including at least two segments, over which packets belonging to a forwarding equivalency class (FEC) are forwarded, the computer-implemented method comprising:
   a) generating a multi-protocol label switching (MPLS) echo request message including (1) a downstream detailed mapping TLV (DDMT), and (2) for each of the at least two segments, a target FEC stack type-length-value (TLV), each target FEC stack TLV having a Nil FEC sub-TLV;
   b) sending the MPLS echo request message with a label stack corresponding to the FEC for forwarding over the static SRTE path;
   c) receiving, by a transit router of the static SRTE path, the MPLS echo request message, wherein the transit router is either (A) at the end of a segment routed (SR) segment, or (B) not at the end of an SR segment;
   wherein if the transit router is not at the end of an SR segment, the computer-implemented method further comprises:
   d) responsive to receiving the MPLS echo request message, checking for validity, by the transit router, label information in the DDMT against information in a local routing table of the transit router; and
   e) responsive to a determination, by the transit router, that the information in the DDMT checked against information in a local routing table of the transit router is invalid,
      generating an MPLS echo reply message (1) addressed to a router of the static SRTE path that generated the MPLS echo request message and (2) including information encoding that there is no label entry in its local routing table corresponding to the information in the DDMT, and
   otherwise, responsive to a determination, by the transit router, that the label information in the DDMT checked against information the local router table of the transit router is valid,
      generating an MPLS echo reply message (1) addressed to a router of the static SRTE path that generated the MPLS echo request message and (2) including information encoding that the label was switched at a label stack depth set in the received MPLS echo request message, and
   wherein if the transit router is at the end of an SR segment, the computer-implemented method further comprises:
   c) responsive to receiving the MPLS echo request message by the transit router, generating an MPLS echo reply message (1) addressed to a router of the static SRTE path that generated the MPLS echo request message and (2) including a FEC Stack change TLV with a post office protocol (POP) operation type.

7. The computer-implemented method of claim 6 wherein the DDMT includes a label-stack sub-TLV.

8. The computer-implemented method of claim 6 further comprising:
   receiving, by a egress router of the SRTE path, the MPLS echo request message; and
   generating an MPLS echo reply message (1) addressed to a router of the static SRTE path that generated the MPLS echo request message and (2) including a return code indicating replying router is the egress router for the FEC at a current stack depth.

9. For use in a system defining a static label-switched path (LSP) over which packets belonging to a forwarding equivalency class (FEC) are forwarded, the static LSP having an ingress device and an egress device, a transit router comprising:
   a) at least one processor; and
   b) a storage device storing instructions which, when performed by the at least one processor, cause the transit router to perform a method for testing the static LSP, the method including
      1) receiving a multi-protocol label switching (MPLS) echo request message including (1) a downstream detailed mapping TLV (DDMT), and (2) a target FEC stack type-length-value (TLV), the target FEC stack TLV having a Nil FEC sub-TLV, wherein the MPLS echo request message was originally provided with a label stack corresponding to the FEC for forwarding over the static LSP,
      2) responsive to receiving the MPLS echo request message, checking for validity, by the transit router, label information in the DDMT against information in a local routing table of the transit router; and
      3) responsive to a determination, by the transit router, that the label information in the DDMT checked against information in a local routing table of the transit router is invalid,
         generating an MPLS echo reply message (1) addressed to a router of the static LSP that generated the MPLS echo request message and (2) including information encoding that there is no label entry in its local routing table corresponding to the information in the DDMT, and
      otherwise, responsive to a determination, by the transit router, that the label information in the DDMT checked against information the local router table of the transit router is valid,
         generating an MPLS echo reply message (1) addressed to a router of the static LSP that generated the MPLS echo request message and (2) including information encoding that the label was switched.

10. The transit router of claim 9, wherein the MPLS echo request message further includes a downstream detailed mapping TLV (DDMT).

11. The transit router of claim 10 wherein the DDMT includes a label-stack sub-TLV.

12. For use in a system defining a static segment routed traffic engineered (SRTE) path, including at least two segments, over which packets belonging to a forwarding equivalency class (FEC) are forwarded, the static SRTE path having an ingress device and an egress device, a transit router comprising:
   a) at least one processor; and
   b) a storage device storing instructions which, when performed by the at least one processor, cause the transit router to perform a method for testing the static SRTE path, the method including
      1) receiving a multi-protocol label switching (MPLS) echo request message including (1) a downstream detailed mapping TLV (DDMT), and (2), for each of the at least two segments, a target FEC stack type-length-value (TLV), each target FEC stack TLV having a Nil FEC sub-TLV, wherein the MPLS echo request message was originally sent with a label stack corresponding to the FEC for forwarding over the static SRTE path, and wherein the transit router is one of either (A) at the end of a segment routed (SR) segment, or (B) not at the end of an SR segment,
      wherein if the transit router is not at the end of an SR segment, the method further includes
      2) responsive to receiving the MPLS echo request message, checking for validity, by the transit router, label information in the DDMT against information in a local routing table of the transit router; and
      3) responsive to a determination, by the transit router, that the information in the DDMT checked against information in a local routing table of the transit router is invalid,
         generating an MPLS echo reply message (1) addressed to a router of the static SRTE path that generated the MPLS echo request message and (2) including information encoding that there is no label entry in its local routing table corresponding to the information in the DDMT, and
      otherwise, responsive to a determination, by the transit router, that the label information in the DDMT checked against information the local router table of the transit router is valid,
         generating an MPLS echo reply message (1) addressed to a router of the static SRTE path that generated the MPLS echo request message and (2) including information encoding that the label was switched at a label stack depth set in the received MPLS echo request message, and
      wherein if the transit router is at the end of an SR segment, the method further includes
      2) generating an MPLS echo reply message (1) addressed to a router of the static SRTE path that generated the MPLS echo request message and (2) including a FEC Stack change TLV with a post office protocol (POP) operation type.

13. A non-transitory computer-readable medium storing processor-executable instructions which, when executed by at least one processor perform a method for testing a static label-switched path (LSP) over which packets belonging to a forwarding equivalency class (FEC) are forwarded, the method comprising:
   a) generating a multi-protocol label switching (MPLS) echo request message including (1) a downstream detailed mapping TLV (DDMT), and (2) a target FEC stack type-length-value (TLV), the target FEC stack TLV having a Nil FEC sub-TLV;
   b) sending the MPLS echo request message with a label stack corresponding to the FEC for forwarding over the static LSP
   c) receiving, by a transit router of the static LSP, the MPLS echo request message;
   d) responsive to receiving the MPLS echo request message, checking for validity, by the transit router, label information in the DDMT against information in a local routing table of the transit router; and
   e) responsive to a determination, by the transit router, that the label information in the DDMT checked against information in a local routing table of the transit router is invalid,
      generating an MPLS echo reply message (1) addressed to a router of the static LSP that generated the MPLS echo request message and (2) including information encoding that there is no label entry in its local routing table corresponding to the information in the DDMT, and otherwise, responsive to a determination, by the transit router, that the label information in the DDMT checked against information the local router table of the transit router is valid,
  generating an MPLS echo reply message (1) addressed to a router of the static LSP that generated the MPLS echo request message and (2) including information encoding that the label was switched.

14. A non-transitory computer-readable medium storing processor-executable instructions which, when executed by at least one processor perform a method for testing a static segment routed traffic engineered (SRTE) path, including at least two segments, over which packets belonging to a forwarding equivalency class (FEC) are forwarded, the method comprising:
  a) generating a multi-protocol label switching (MPLS) echo request message including (1) a downstream detailed mapping TLV (DDMT), and (2), for each of the at least two segments, a target FEC stack type-length-value (TLV), each target FEC stack TLV having a Nil FEC sub-TLV; and
  b) sending the MPLS echo request message with a label stack corresponding to the FEC for forwarding over the static SRTE path;
  c) receiving, by a transit router of the static SRTE path, the MPLS echo request message, wherein the transit router is one of either (A) at the end of a segment routed (SR) segment, or (B) not at the end of an SR segment;
wherein if the transit router is not at the end of an SR segment, the method further comprises:
  d) responsive to receiving the MPLS echo request message, checking for validity, by the transit router, label information in the DDMT against information in a local routing table of the transit router; and
  e) responsive to a determination, by the transit router, that the information in the DDMT checked against information in a local routing table of the transit router is invalid,
    generating an MPLS echo reply message (1) addressed to a router of the static SRTE path that generated the MPLS echo request message and (2) including information encoding that there is no label entry in its local routing table corresponding to the information in the DDMT, and
  otherwise, responsive to a determination, by the transit router, that the label information in the DDMT checked against information the local router table of the transit router is valid,
    generating an MPLS echo reply message (1) addressed to a router of the static SRTE path that generated the MPLS echo request message and (2) including information encoding that the label was switched at a label stack depth set in the received MPLS echo request message, and
wherein if the transit router is at the end of an SR segment, the method further comprises:
  d) responsive to receiving the MPLS echo request message by the transit router, generating an MPLS echo reply message (1) addressed to a router of the static SRTE path that generated the MPLS echo request message and (2) including a FEC Stack change TLV with a post office protocol (POP) operation type.

* * * * *